United States Patent
Chen et al.

(10) Patent No.: US 12,267,493 B2
(45) Date of Patent: *Apr. 1, 2025

(54) METHOD FOR USING ADAPTIVE LOOP FILTER AND SYSTEM THEREOF

(71) Applicant: ALIBABA GROUP HOLDING LIMITED, Grand Cayman (KY)

(72) Inventors: Jie Chen, San Mateo, CA (US); Ru-Ling Liao, San Mateo, CA (US); Xinwei Li, San Mateo, CA (US); Yan Ye, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,824

(22) Filed: Nov. 16, 2023

(65) Prior Publication Data

US 2024/0089430 A1 Mar. 14, 2024

Related U.S. Application Data

(63) Continuation of application No. 17/456,621, filed on Nov. 26, 2021, now Pat. No. 11,863,742.

(Continued)

(51) Int. Cl.
*H04N 19/82* (2014.01)
*H04N 19/117* (2014.01)
(Continued)

(52) U.S. Cl.
CPC .......... *H04N 19/117* (2014.11); *H04N 19/17* (2014.11); *H04N 19/182* (2014.11); *H04N 19/82* (2014.11)

(58) Field of Classification Search
CPC .... H04N 19/117; H04N 19/17; H04N 19/176; H04N 19/70; H04N 19/182; H04N 19/82
See application file for complete search history.

(56) References Cited

U.S. PATENT DOCUMENTS

| 11,863,742 B2* | 1/2024 | Chen .................. H04N 19/176 |
| 2012/0082244 A1* | 4/2012 | Chen .................... H04N 19/82 |
| | | 375/E7.189 |

(Continued)

FOREIGN PATENT DOCUMENTS

| CN | 105357538 A | 2/2016 |
| CN | 108141620 A | 6/2018 |

(Continued)

OTHER PUBLICATIONS

European Patent Office Communication issued for Application No. 21899980.3 the Supplementary European Search Report (Art. 153(7) EPC) and the European search opinion dated Dec. 14, 2023, 188 pages.

(Continued)

*Primary Examiner* — Tsion B Owens
(74) *Attorney, Agent, or Firm* — Finnegan, Henderson, Farabow, Garrett & Dunner, LLP

(57) ABSTRACT

The present disclosure provides a video data processing method. The method includes: receiving a bitstream; decoding a first index from the bitstream; determining a maximum number of an adaptive loop filter (ALF) for a component of a picture based on the first index; and processing pixels in the picture with the ALF.

20 Claims, 23 Drawing Sheets

Related U.S. Application Data

(60) Provisional application No. 63/121,142, filed on Dec. 3, 2020.

(51) Int. Cl.
  *H04N 19/17* (2014.01)
  *H04N 19/182* (2014.01)

(56) References Cited

U.S. PATENT DOCUMENTS

| | | |
|---|---|---|
| 2013/0156097 A1 | 6/2013 | Budagavi et al. |
| 2020/0314424 A1 | 10/2020 | Hu et al. |
| 2020/0329239 A1 | 10/2020 | Hsiao et al. |
| 2021/0385445 A1* | 12/2021 | Auyeung .............. H04N 19/46 |
| 2021/0385446 A1 | 12/2021 | Liu et al. |
| 2021/0385482 A1 | 12/2021 | Liu et al. |
| 2022/0182617 A1* | 6/2022 | Chen ................... H04N 19/117 |
| 2022/0272334 A1 | 8/2022 | Li et al. |

FOREIGN PATENT DOCUMENTS

| | | |
|---|---|---|
| WO | WO 2012/137890 A1 | 11/2013 |
| WO | WO 2022/116949 A1 | 6/2022 |

OTHER PUBLICATIONS

Ken Lawrence Hisilcon Technologies Co Ltd: "TM-AVC1213r0-AVS3-P2 spec-20210323-eng (DVB watermark)" DVB, Digital Video Broadcasting, 2021, 403 pages.

Zhang et al., "AHG9: Restricted maximum numbers of ALF and CC-ALF filters," JVET-R0480-v2, 18$^{th}$ Meeting: by teleconference, Apr. 15-24, 2020, 8 pages.

PCT International Search Report and Written Opinion mailed Feb. 25, 2022, issued in corresponding International Application No. PCT/CN2021/134174 (7 pgs.).

* cited by examiner

METHOD FOR USING ADAPTIVE LOOP FILTER AND SYSTEM THEREOF

CROSS-REFERENCE TO RELATED APPLICATIONS

The present disclosure is a continuation of U.S. application Ser. No. 17/456,621, filed Nov. 26, 2021, which claims the benefits of priority to U.S. Provisional Application No. 63/121,142, filed on Dec. 3, 2020, both of which incorporated herein by reference in their entireties.

TECHNICAL FIELD

The present disclosure generally relates to video processing, and more particularly, to systems and methods for using adaptive loop filter (ALF) in video coding and decoding.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a video data processing method. The method includes: receiving a bitstream; decoding a first index from the bitstream; determining a maximum number of an adaptive loop filter (ALF) for a component of a picture based on the first index; and processing pixels in the picture with the ALF.

Embodiments of the present disclosure provide an apparatus for performing video data processing, the apparatus comprises a memory configured to store instructions; and one or more processors configured to execute the instructions to cause the apparatus to perform: receiving a bitstream; decoding a first index from the bitstream; determining a maximum number of an adaptive loop filter (ALF) for a component of a picture based on the first index; and processing pixels in the picture with the ALF.

Embodiments of the present disclosure provide a non-transitory computer-readable storage medium that stores a set of instructions that is executable by one or more processors of an apparatus to cause the apparatus to initiate a video data processing method. The method includes: receiving a bitstream; decoding a first index from the bitstream; determining a maximum number of an adaptive loop filter (ALF) for a component of a picture based on the first index; and processing pixels in the picture with the ALF.

Embodiments of the present disclosure provide a non-transitory computer readable medium storing a data stream. The bitstream includes a first index associated with video data, the first index being encoded based on one or more of a plurality of contexts used in binary entropy encoding and indicating a maximum number of an adaptive loop filter (ALF) for a component of a picture.

BRIEF DESCRIPTION OF THE DRAWINGS

Embodiments and various aspects of the present disclosure are illustrated in the following detailed description and the accompanying figures. Various features shown in the figures are not drawn to scale.

Figures 9A, 9B:
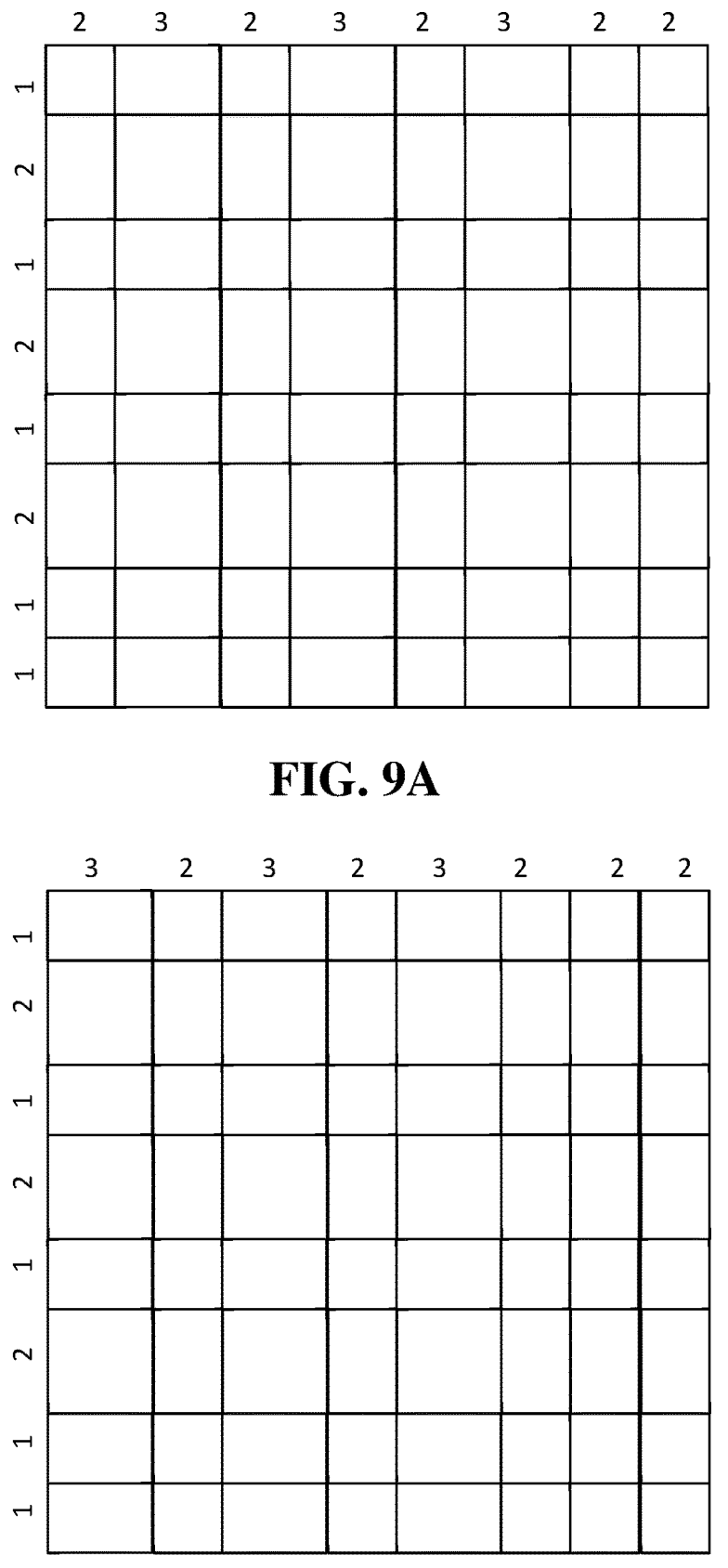
Figures 9C, 9D:
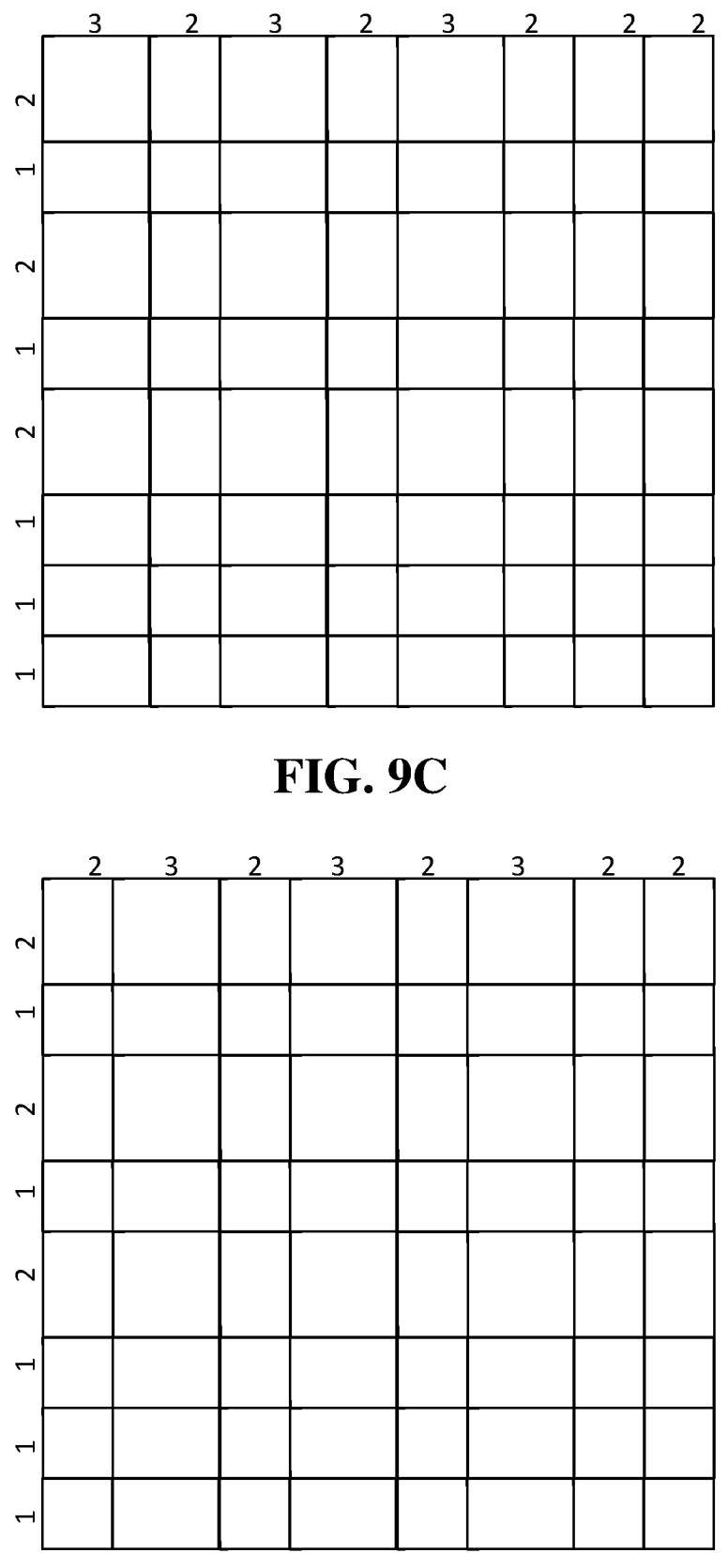

FIG. 9A illustrates an exemplary ALF region portioning pattern, according to some embodiments of the present disclosure.

FIG. 9B illustrates another exemplary ALF region portioning pattern, according to some embodiments of the present disclosure.

FIG. 9C illustrates another exemplary ALF region portioning pattern, according to some embodiments of the present disclosure.

FIG. 9D illustrates another exemplary ALF region portioning pattern, according to some embodiments of the present disclosure.

FIG. 10A illustrates an exemplary ALF region order for 64 regions, according to some embodiments of the present disclosure.

FIG. 10B illustrates another exemplary ALF region order for 64 regions, according to some embodiments of the present disclosure.

FIG. 10C illustrates another exemplary ALF region order for 64 regions, according to some embodiments of the present disclosure.

FIG. 10D illustrates another exemplary ALF region order for 64 regions, according to some embodiments of the present disclosure.

DETAILED DESCRIPTION

Figure 1:
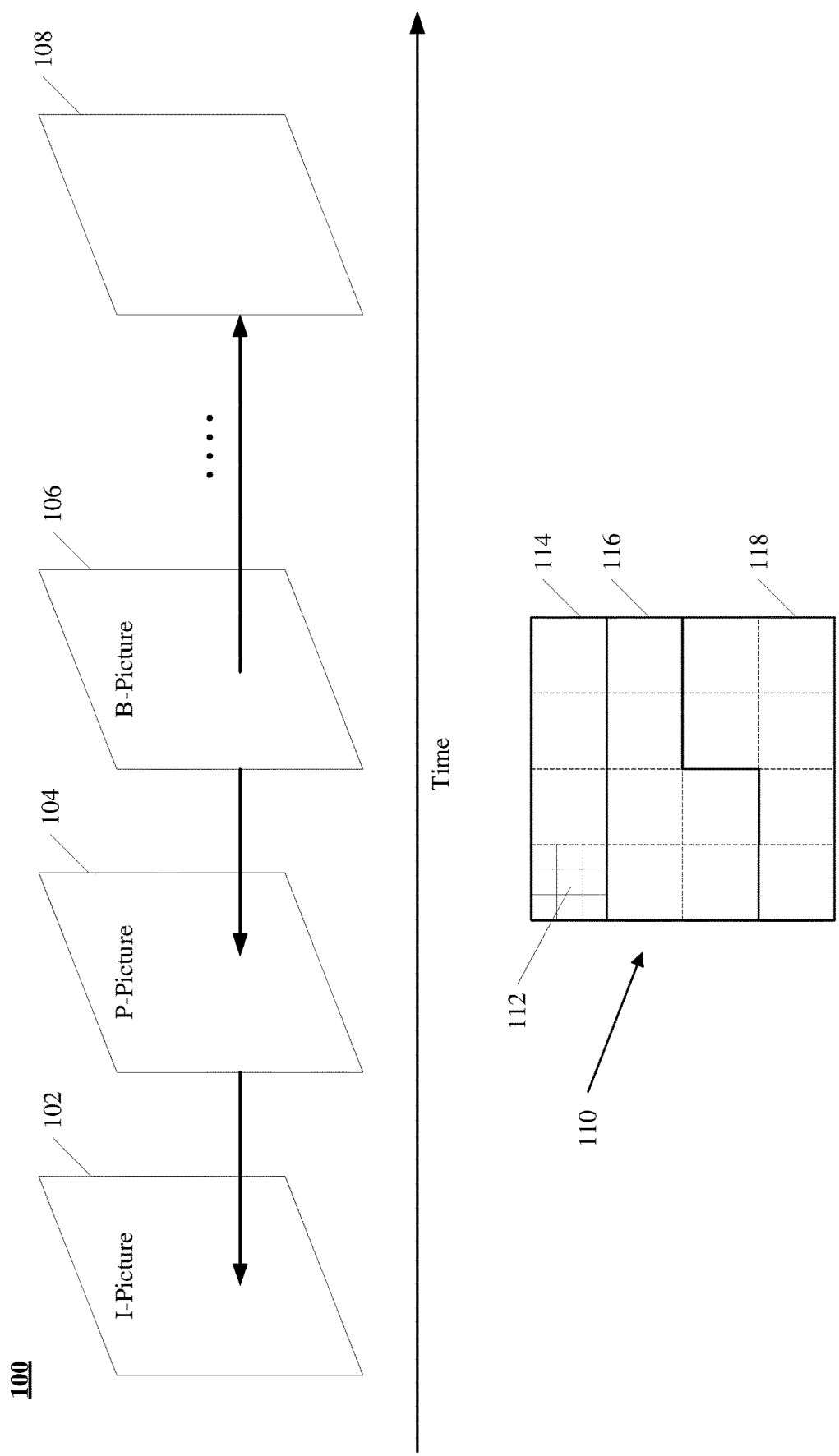
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Audio Video coding Standard (AVS) Workgroup, which was founded in China in 2002, is currently developing the AVS3 video standard, a third generation of AVS video standard. The predecessors of the AVS3 standard, AVS1 and AVS2, were issued as China in the year of 2006 and 2016, respectively. In December of 2017, a call for proposals (CfP) was issued by the AVS workgroup to formally start the development of the third generation of AVS standard, AVS3. In December of 2018, a High Performance Model (HPM) was chosen by the workgroup as a new reference software platform for the AVS3 standard development. The initial technologies in HPM were inherited from AVS2 standard, and based on that, more and more new advanced video coding technologies were adopted to improve the compression performance. In 2019, for example, the first phase of the AVS3 standard was finalized and got more than 20% coding performance gain compared with its predecessor AVS2, and the second phase of AVS3 standard is still being developed on top of the first phase of AVS3 to get further coding efficiencies.

The AVS3 standard has been developed recently, and continues to include more coding technologies that provide better compression performance. AVS3 is based on the same hybrid video coding system that has been used in modern video compression standards such as AVS1, AVS2, H.265/HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x, AVS series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless."

Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC, H.266/VVC, AVS). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC, H.266/VVC, AVS). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC, H.266/VVC, AVS). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
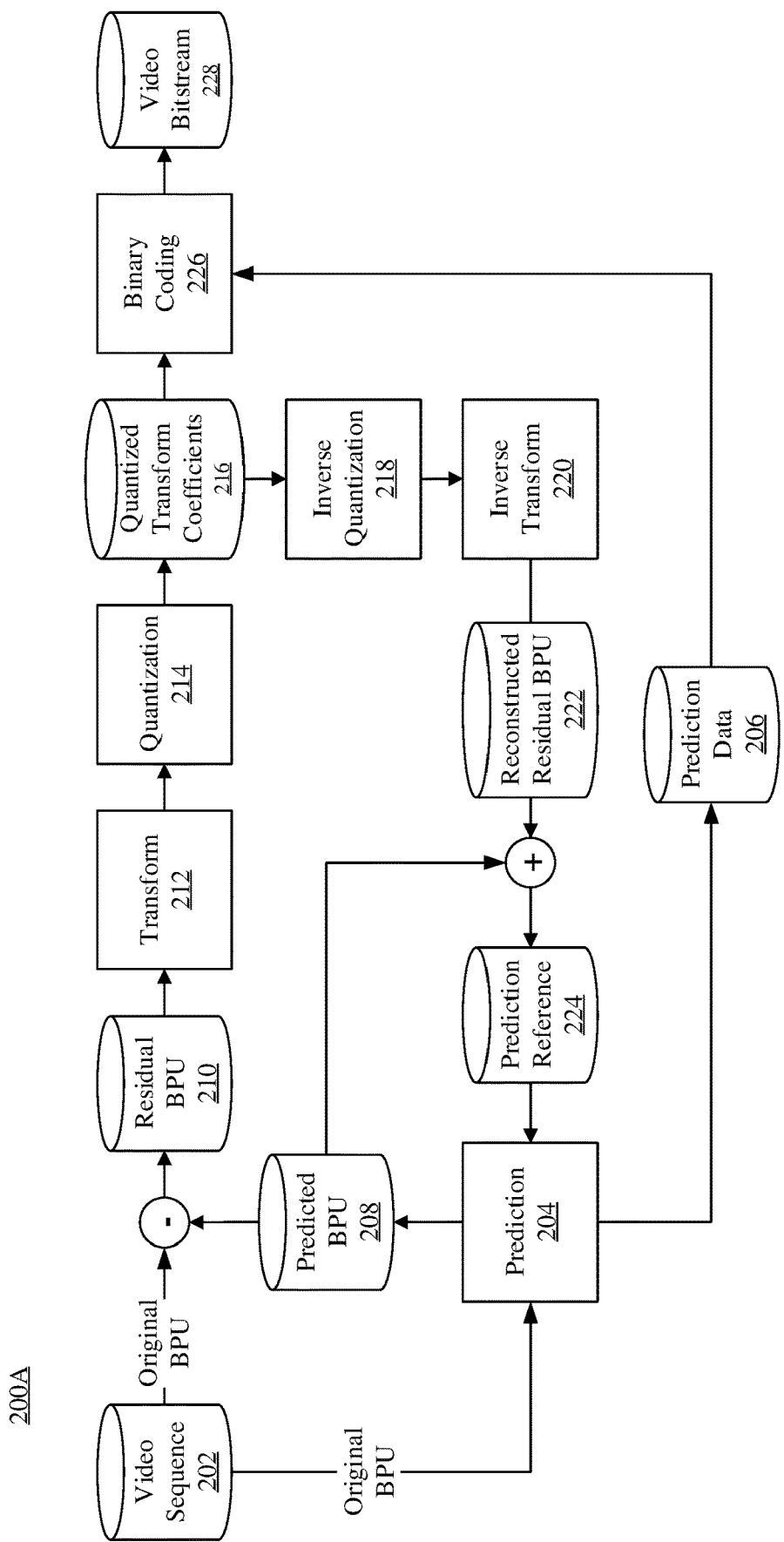
FIG. 2A is a schematic diagram illustrating an exemplary encoding process of a hybrid video coding system, consistent with embodiments of the disclosure.
Figure 2B:
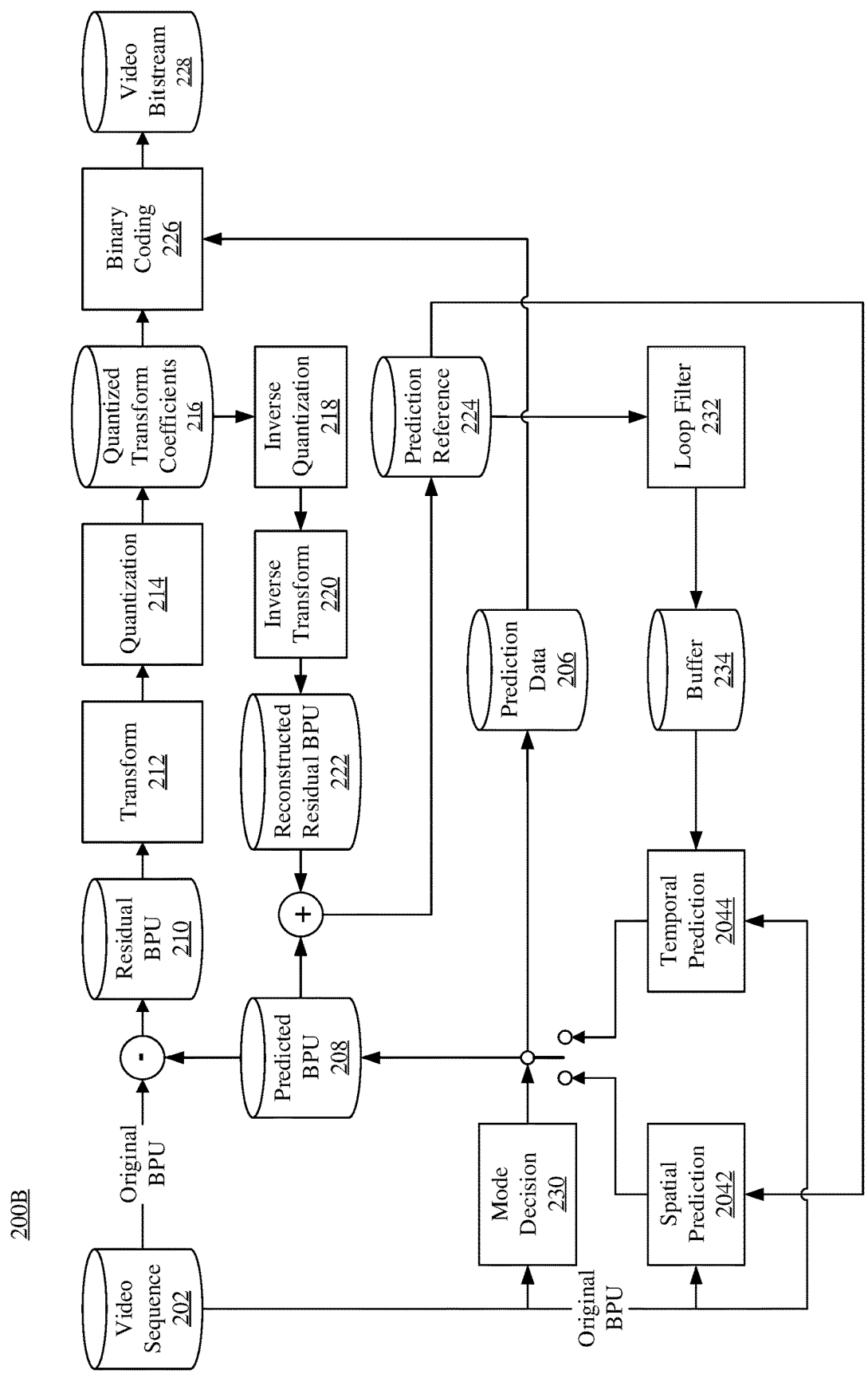
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC, H.266/VVC, AVS), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC, H.266/VVC, AVS), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC, H.266/VVC, AVS), at the level of which the transform operation can be performed. It should be noted that the division schemes of the same basic processing sub-unit can be different at the prediction stage and the transform stage. For example, in H.265/HEVC, H.266/VVC or AVS, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC, H.266/VVC and AVS provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters (ALFs), or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
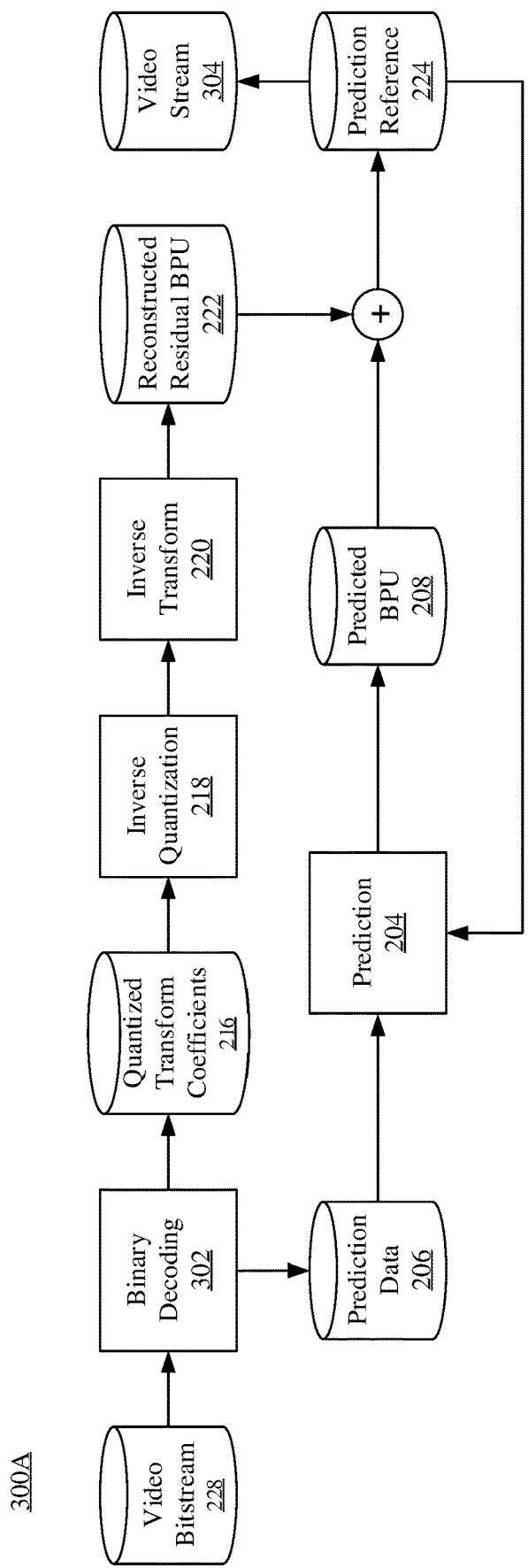
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
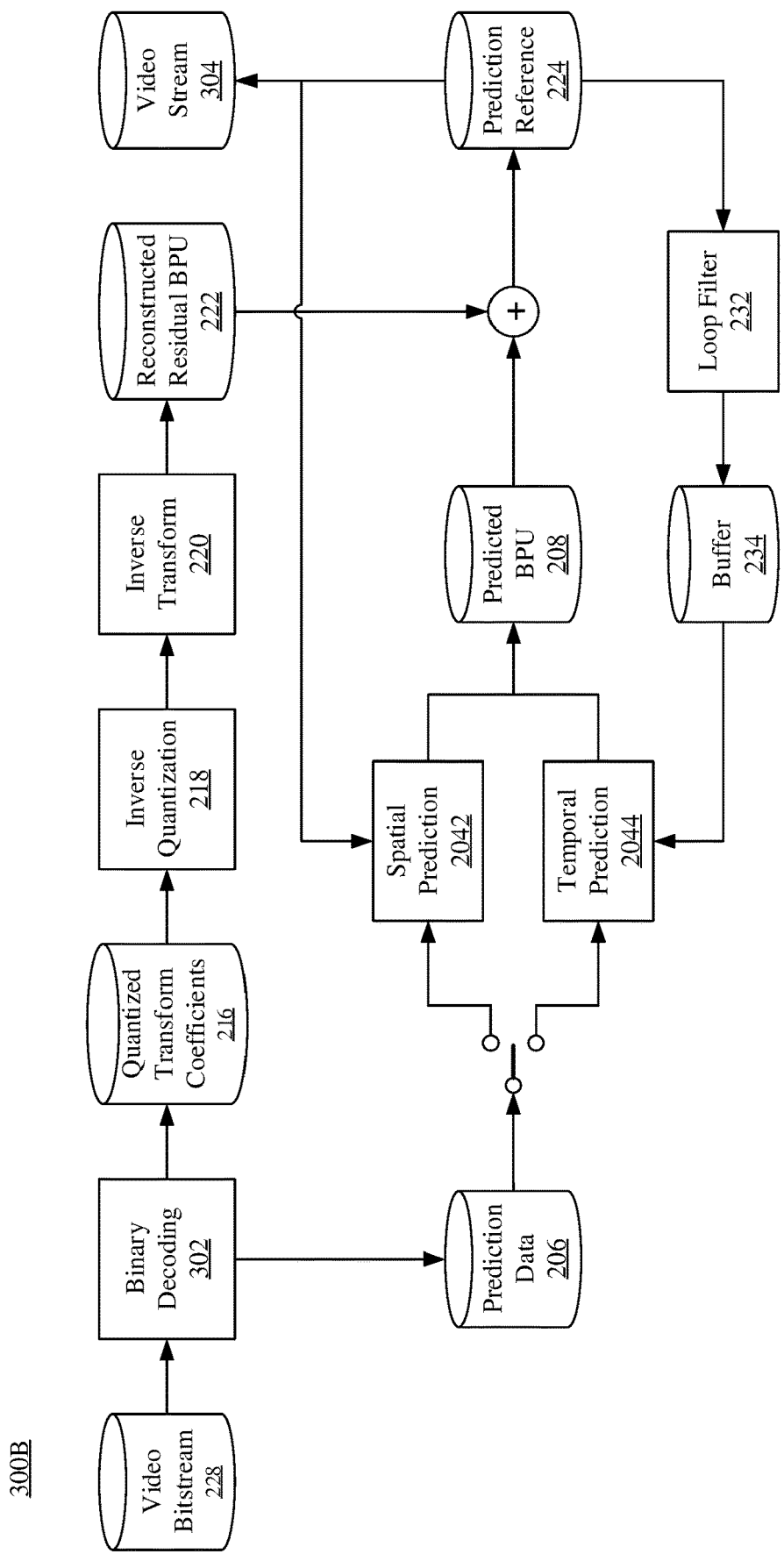
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
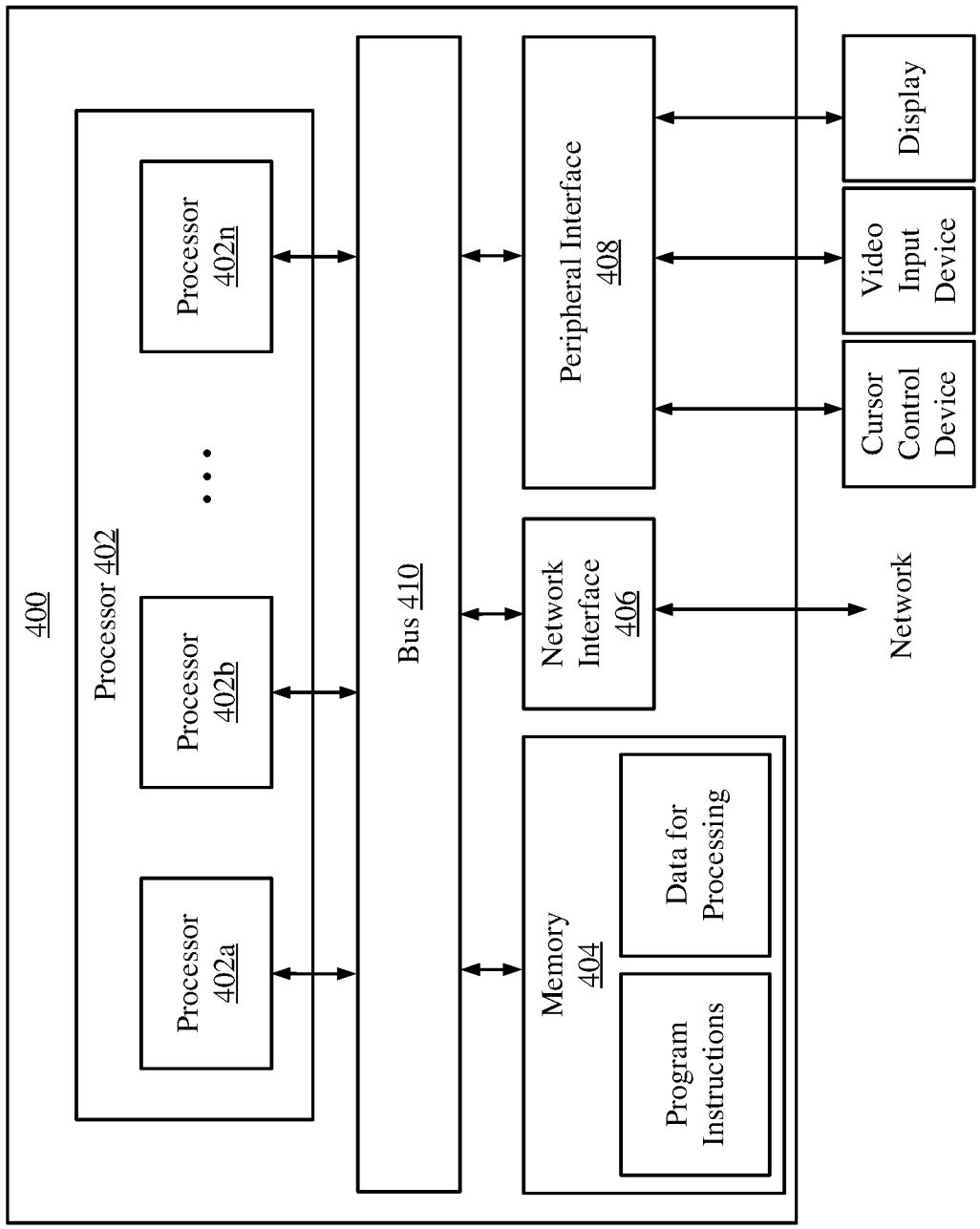
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Adaptive loop filter (ALF) is an in-loop filter (e.g., applied by loop filter 232 of H.266/VVC in FIGS. 2B and 3B) which is applied on the reconstructed samples to further refine the reconstructed samples and get the final decoded samples output by the decoder. The purpose of ALF is to improve the quality of the reconstructed samples and reduce the coding errors.

ALF introduces the Wiener filter in the coding loop to minimize the mean square error between original samples and decoded samples. The value of the filtered sample is generated by weighted averaging the value of the current un-filtered sample and the values of the un-filtered spatial neighboring samples. The weights, which are called coefficients of the filter, are determined by the encoder and explicitly signaled to the decoder.

Figure 5A:
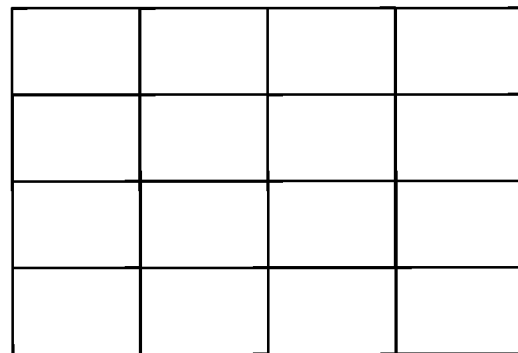
FIG. 5A illustrates exemplary dividing a picture into 16 adaptive loop filter (ALF) regions, according to some embodiments of the present disclosure.

FIG. 5A illustrates exemplary dividing a picture into 16 adaptive loop filter (ALF) regions. As shown in FIG. 5A, for example, in AVS3, to adapt the filter to the content, a whole picture is divided into 16 regions (4 columns by 4 rows), and each region has an index. The index identifies the region. Each of the 16 regions may have a different filter (e.g., a different group of coefficients). Accordingly, at most there are 16 filters (e.g., 16 groups of coefficients) signaled for one picture. These groups of coefficients are signaled one group by one group according to the order of the regions. Thus, the index of the ALF for each region can be easily determined since one filter is applied on one region.

Figure 5B:
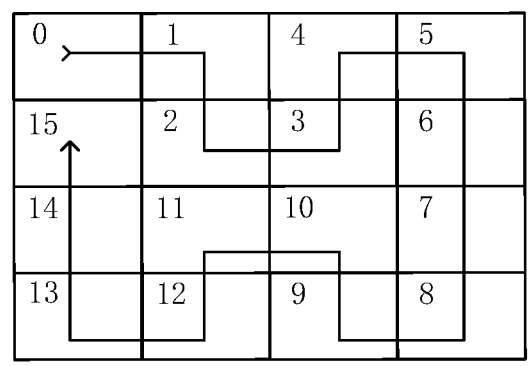
FIG. 5B illustrates region order and region sequence numbers of each region for 16 ALF regions, according to some embodiments of the present disclosure.

FIG. 5B illustrates exemplary region order and region sequence numbers of each region, wherein a curve shows the order of the regions. As shown in FIG. 5B, the 16 regions are numbered with region sequence numbers from 0 to 15, and traversed along the curve.

Figure 5C:
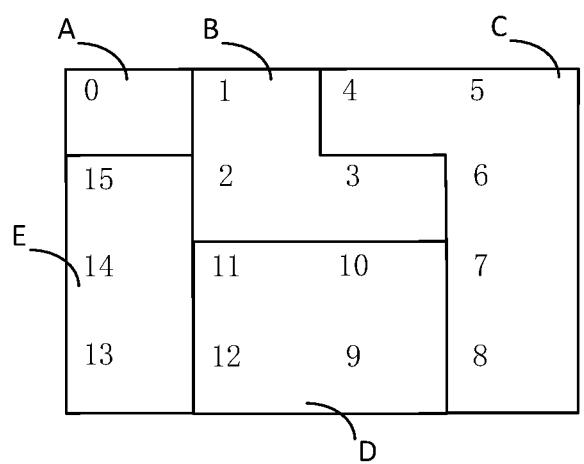
FIG. 5C illustrates exemplary merged regions, according to some embodiments of the present disclosure.

Dividing the picture into multiple regions and separately deriving coefficients for each region gives a better localization of the filter, but the penalty is that the signaling cost increases as more coefficients need to be signaled. For some smooth content, different regions in one picture may share similar content characteristics, and thus there is no need to derive different filters for each different region. Thus, to save the signaling cost for these video sequences, a region merge mechanism is adopted. Any two connected regions in the region order (e.g., the regions with consecutive sequence numbers) may be merged into one region and have one group of filter coefficient. The merged region may be further merged with its connected regions. For example, region 4 and region 5 may be merged into region 45, and region 45 may be continually merged with region 3 or region 6 until the whole picture is one region. The encoder decides how to merge the 16 regions and signal merged regions to the decoder. Thus, the number of filters (e.g., the number of coefficient groups) for each picture may change from picture to picture according to the merged result which may be decided by the encoder based on the current picture content. FIG. 5C shows an exemplary merged region. As shown in FIG. 5C, for example, region 0 is taken as merged region A;

region 1 to region 3 are merged into merged region B; region 4 to region 8 are merged into merged region C, region 9 to region 12 are merged into merged region D, and region 13 to region 15 are merged into merged region E. Accordingly, totally there are 5 merged regions in one picture wherein 5 groups (instead of 16 groups) of coefficients are signaled for this picture. Therefore, the signaling cost is saved. In the decoder side, by decoding the merged region information, the ALF index for a region can be determined since one filter is applied to one merged region, and then the decoder can process the current region with the ALF based on the ALF index. During ALF process, a region is partitioned one or more ALF units, and the pixels are processed one unit by one unit. As the ALF unit is a subset of a region, all the pixels in one ALF unit are processed by one ALF (i.e., share one group of ALF coefficient). Thus, the pixels in one ALF unit have the same ALF index.

However, in the current ALF design, there are several problems.

In one aspect, in the current ALF design, a picture can be at most divided into 16 regions. However, for high resolution pictures, such as 2K and 4K, dividing into 16 regions may not be sufficient because one region can only have one filter. That is, 1/16 of a high-resolution picture may be too large of region because it could include various content that may require different filters. Thus, applying one filter to all these samples may reduce the coding performance of ALF.

In another aspect, in the current ALF design, a picture is divided into 16 regions with a fixed partitioning pattern. However, the video content is different from one picture to another. Thus, the fixed partitioning pattern cannot be fit to all pictures. In some case, the different content has to be included in the same region that influences the coding performance of the ALF.

In a further aspect, in the current design, only one fixed order is defined for the 16 regions and only connected regions in a sequence can be merged. Accordingly, some spatial neighboring cannot be merged since they are not connected in the defined order. For example, as shown in FIG. 5C, taken two spatial neighboring regions, region 2 and region 11, for example, since they are not in a sequence connected, they are not allowed to be merged. So even though these two regions share the similar content, they cannot be merged. Thus, the encoder has to signal two similar filters for these two regions, which increases the signaling overhead.

The present disclosure provides methods and systems for solving some or all of the above problems.

Figure 6A:
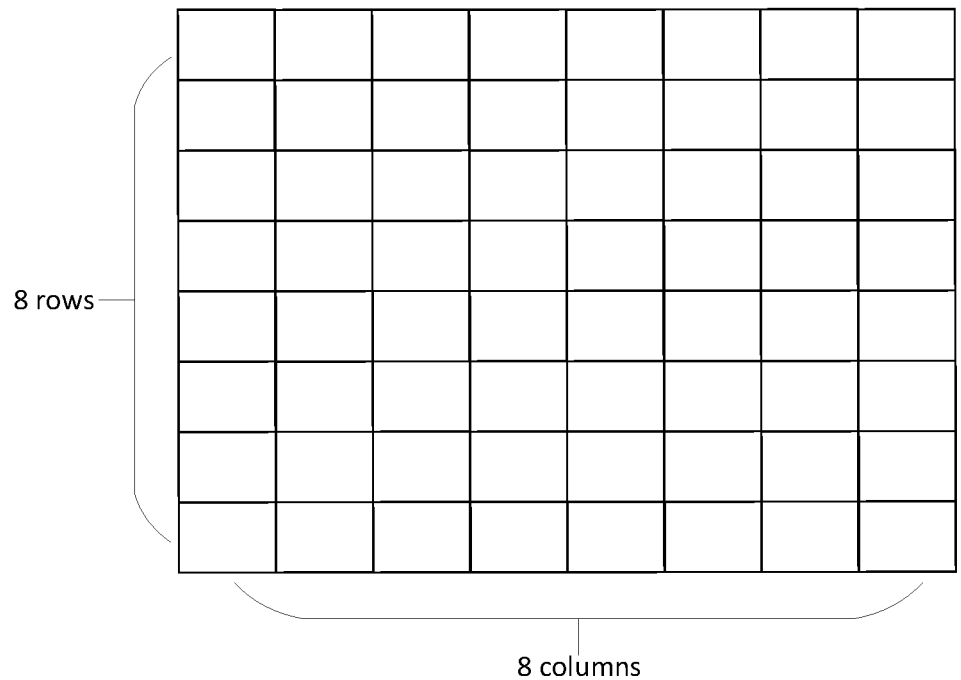
FIG. 6A illustrates dividing a picture into more than 16 ALF regions, according to some embodiments of the present disclosure.
Figure 6B:
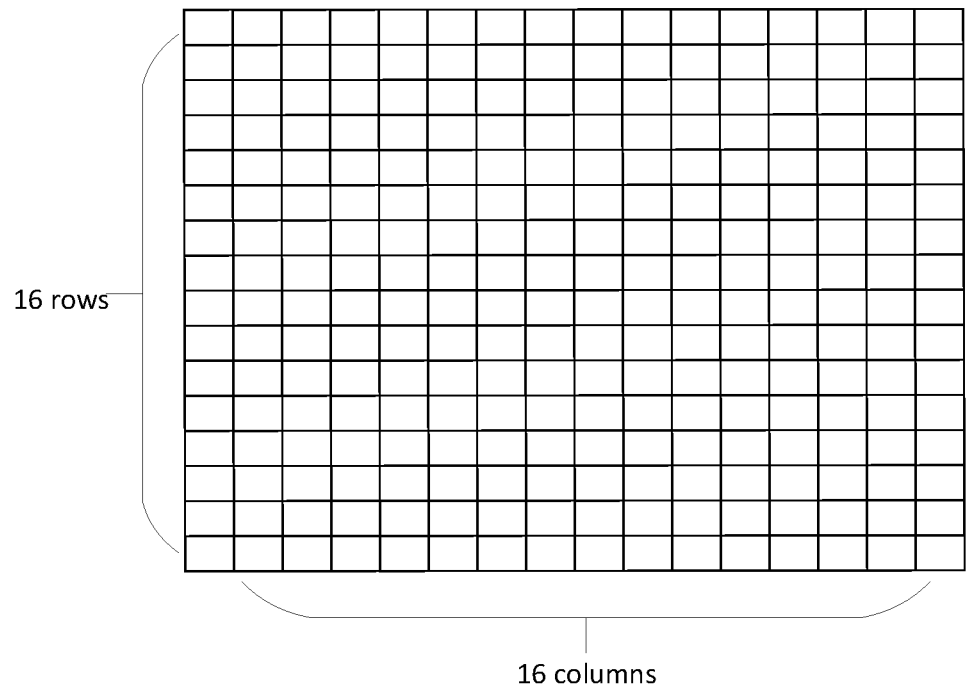
FIG. 6B illustrates dividing a picture into more than 16 ALF regions, according to some embodiments of the present disclosure.

According to some exemplary embodiments, a picture is divided into more than 16 regions. In some embodiments, a picture is divided with the same number of region columns and region rows. For example, FIG. 6A illustrates an exemplary picture divided into 64 regions, according to some embodiments of present disclosure. FIG. 6B illustrates an exemplary picture divided into 256 regions, according to some embodiments of present disclosure. As shown in FIG. 6A, a picture is divided into 8 region columns and 8 region rows to obtain 64 regions. And as shown in FIG. 6B, a picture is divided into 16 region columns and 16 region rows to obtain 256 regions.

Figure 6C:
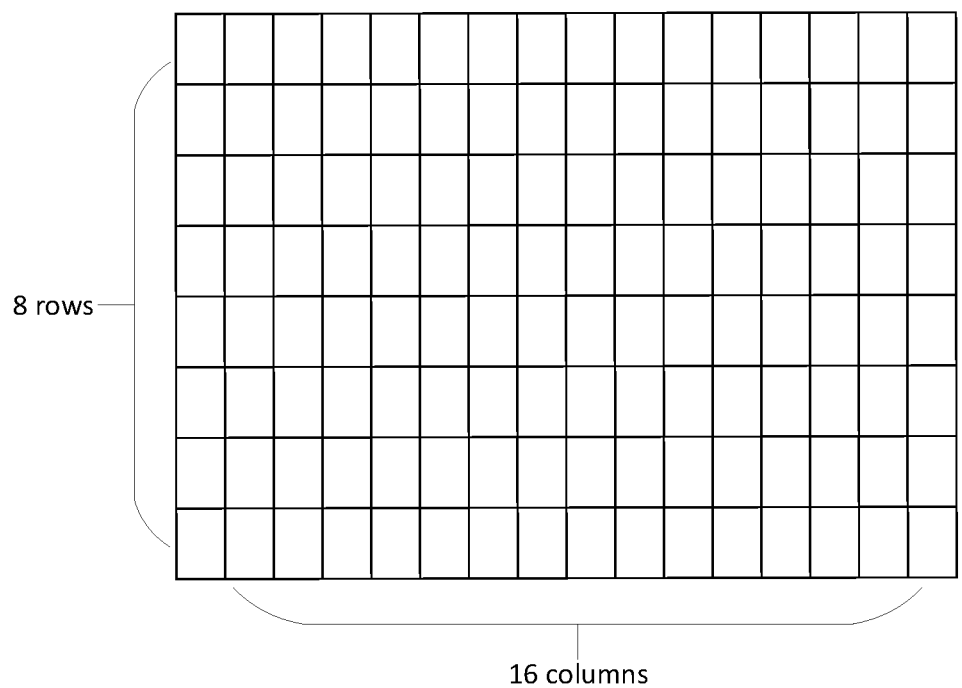
FIG. 6C illustrates dividing a picture into more than 16 ALF regions, according to some embodiments of the present disclosure.

In some embodiments, a picture is divided with different numbers of region columns and region rows. FIG. 6C illustrates another exemplary picture divided into 128 regions. As shown in FIG. 6C, a picture is divided into 16 region columns and 8 region rows, thereby obtaining 128 regions, in which the region column number (i.e., 16) is different from region row number (i.e., 8) since usually the picture width is greater than the picture height.

While increasing the region number is beneficial to a larger picture, it may not be beneficial for a small picture as it could increase the signalling burden. Thus, in some embodiments, the number of regions is variable and it may depend on the resolution of the picture. For example, a large picture has more ALF regions than a small picture.

In some embodiments, the number of regions is determined by different scales or one or more threshold values. For example, a width of a picture is noted as W, and a height of the picture is noted as H. If W×H is less than or equal to a first threshold value TH1 (e.g., 1920×1080), the picture is divided into a first number of regions (e.g., 64 regions as shown in FIG. 6A); if W×H is greater than TH1 but less than a second threshold value TH2 (e.g., 3840×2160), the picture is divided into a second number of regions (e.g., 128 regions as shown in FIG. 6C); if W×H is greater than or equal to TH2, the picture is divided into a third number of regions (e.g., 256 regions as shown in FIG. 6B). In some embodiments, the number of regions is proportional to the threshold value. It could be understood that there is no limit for the number of threshold values, different numbers of regions can correspond to different threshold intervals.

In some embodiments, the number of regions is determined based on width and height, respectively. If W is less than a width threshold TW, the picture is divided into 8 region columns; if W is greater than or equal to TW, the picture is divided into 16 region columns. If H is less than a height threshold TH, the picture is divided into 8 region rows; if H is greater than or equal to TH, the picture is divided into 16 region rows. It could be understood that there could be more than one width threshold and more than one height threshold. The number of region columns and number of region rows correspond to different width threshold intervals and height threshold intervals, respectively.

In some embodiments, the number of regions is selected from a set of pre-set region numbers according to the size of the picture. For example, a basic area (e.g., 16×16=256 pixels) is defined as Ba, the number of basic area N in one picture is calculated as N=W×H/Ba. Then N is rounded into a set of pre-set region numbers. As in FIGS. 6A-6C, the set of pre-set region numbers includes 64, 128 and 256, so N can be rounded into 64, 128 and 256.

In some embodiments, the number of regions is selected from a set of pre-set column numbers and a set of pre-set row numbers based on width and height respectively. Two basic lengths Lw and Lh are defined for width and height. The number of basic length in picture width is calculated as Nw=W/Lw and the number of basic length in picture height is calculated as Nh=H/Lh. Then Nw is round into the set of pre-set column numbers and Nh is rounded into the set of pre-set row numbers. As shown in FIGS. 6A-6C, the set of pre-set column numbers includes 8 and 16, so Nw is rounded into 8 or 16. The set of pre-set row numbers is 8 and 16, so Nh is rounded into 8 or 16. The pre-set column numbers and the pre-set row numbers are supported for a picture by an encoder/decoder.

In some embodiments, to simplify the filter operation, a region may be largest coding unit (LCU) aligned. That is, the boundary of each region should be LCU boundary or picture boundary so that all the pixels within one LCU have the same filter.

In some embodiments, variable region numbers are supported in a video sequence. That is, in one video sequence, the numbers of regions may differ from different pictures. Therefore, the number of regions can be adapted to the picture so as to improve the efficiency of the video processing. In some embodiments, one region has at most one ALF but different regions may share one ALF. Therefore, a maximum number of the ALF is equal to the region number of a picture. In some embodiments, a picture contains different components (e.g., chroma components and a luma component), and ALF can be performed on each component. Therefore, the encoder can decide how many regions in one picture in picture level or sequence level and signal an index indicating the maximum number of the ALF for a component of the picture in a bitstream. After receiving the bitstream, the decoder determines the maximum number of the ALF for the current picture or for the current video sequence according to the index parsed from the bitstream.

According to some exemplary embodiments, different partitioning patterns are provided. FIGS. 7A-7D illustrate examples of different partitioning patterns, according to some embodiments consistent with the present disclosure.

Figure 7A:
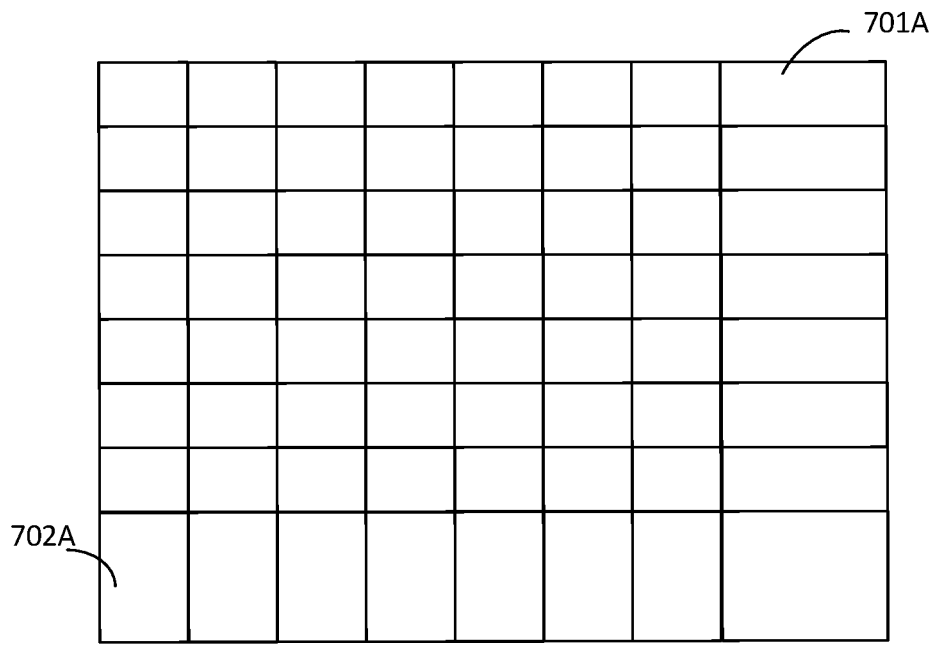
FIG. 7A illustrates an exemplary ALF region portioning pattern, according to some embodiments of the present disclosure.
Figure 7B:
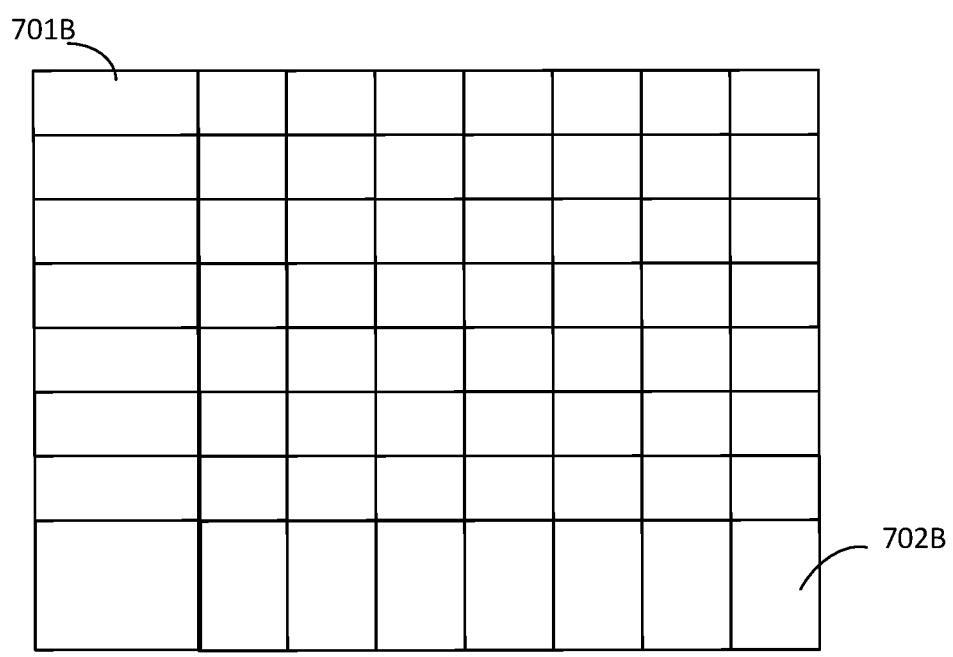
FIG. 7B illustrates another exemplary ALF region portioning pattern, according to some embodiments of the present disclosure.
Figure 7C:
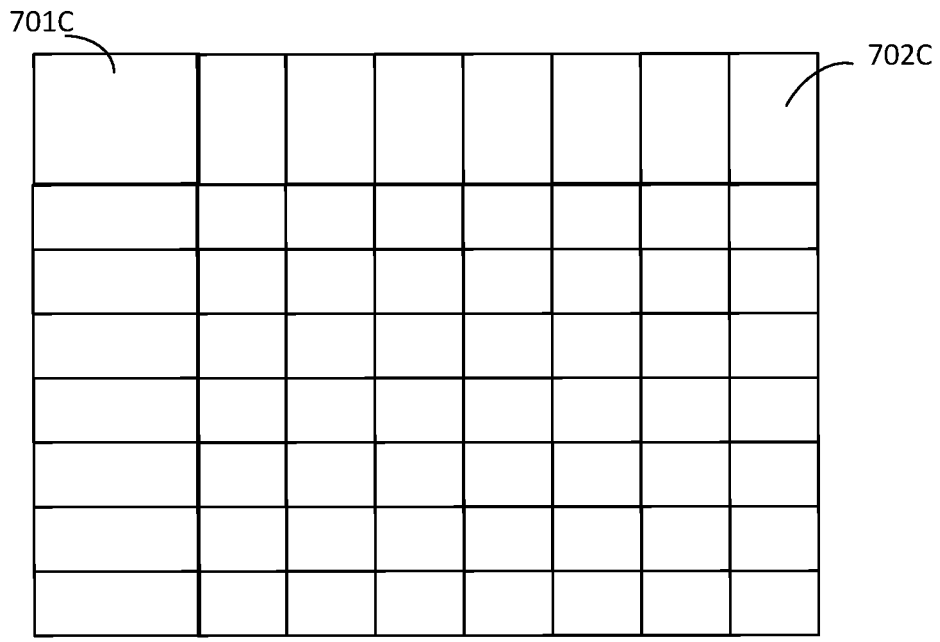
FIG. 7C illustrates another exemplary ALF region portioning pattern, according to some embodiments of the present disclosure.
Figure 7D:
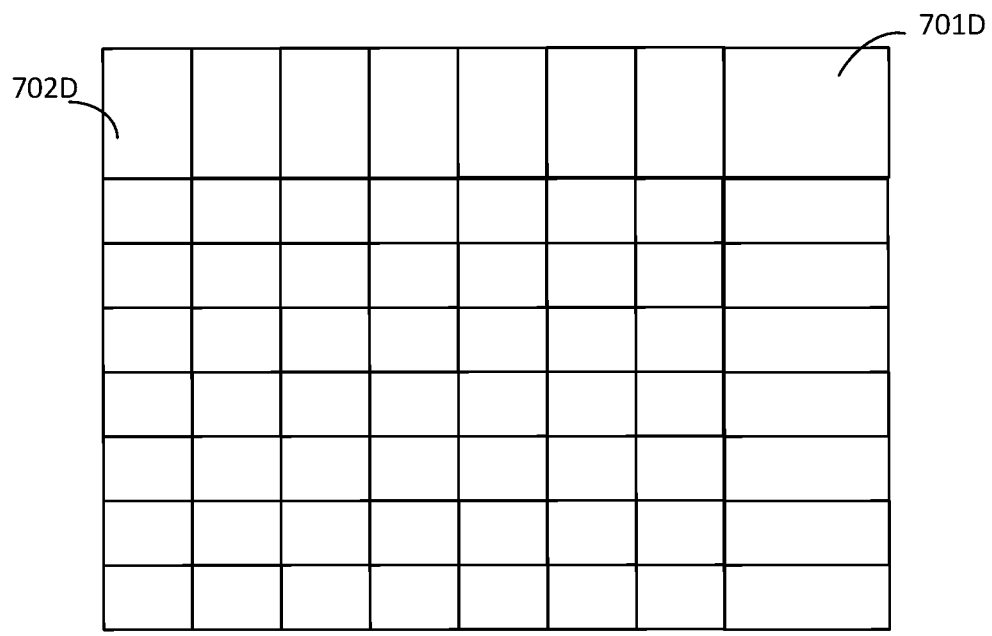
FIG. 7D illustrates another exemplary ALF region portioning pattern, according to some embodiments of the present disclosure.

FIG. 7A shows an exemplary ALF region partitioning pattern, according to some embodiments of the present disclosure. The picture is divided into multiple region columns and region rows. If the picture width is not a multiple of region column number, then all the region columns except the last one 701A have the same width. Similarly, if the picture height is not a multiple of region row number, all the region rows except the last one 702A have the same height. FIGS. 7B-7D show exemplary ALF region partitioning patterns according to some embodiments of present disclosure. As shown in FIGS. 7B-7D, if the picture width is not a multiple of region column number, the first column or the last column can have different widths than the others; if the picture height is not a multiple of region row number, the first row or the last row can have different height than the others. If both the picture width and the picture height are not a multiple of region column number and region row number respectively, there can be four different ALF region partitioning patterns, e.g., as shown in FIGS. 7A-7D. For example, as shown in FIG. 7B, the first column 701B has a different width than other columns, and the last row 702B has a different height than other rows; in FIG. 7C, the first column 701C has a different width than other columns, and the first row 702C has a different height than other rows; in FIG. 7D, the last column 701D has a different width than other columns, and the first row 702D has a different height than other rows.

For example, if the picture width is 30 in unit of LCU width and picture height is 17 in unit of LCU height, and if the picture is to be divided into 8 region columns and 8 region rows, then for partitioning pattern in FIG. 7A, the width of each region column is 4, 4, 4, 4, 4, 4, 4, 2 in unit of LCU width, the height of each region row is 2, 2, 2, 2, 2, 2, 2, 3 in unit of LCU height; for partitioning pattern in FIG. 7B, the width of each region column is 2, 4, 4, 4, 4, 4, 4, 4 in unit of LCU width, the height of each region row is 2, 2, 2, 2, 2, 2, 2, 3 in unit of LCU height; for partitioning pattern in FIG. 7C, the width of each region column is 2, 4, 4, 4, 4, 4, 4, 4 in unit of LCU width, the height of each region row is 3, 2, 2, 2, 2, 2, 2, 2 in unit of LCU height; for partitioning pattern in FIG. 7D, the width of each region column is 4, 4, 4, 4, 4, 4, 4, 2 in unit of LCU width, the height of each region row is 3, 2, 2, 2, 2, 2, 2, 2 in unit of LCU height.

Figure 8:
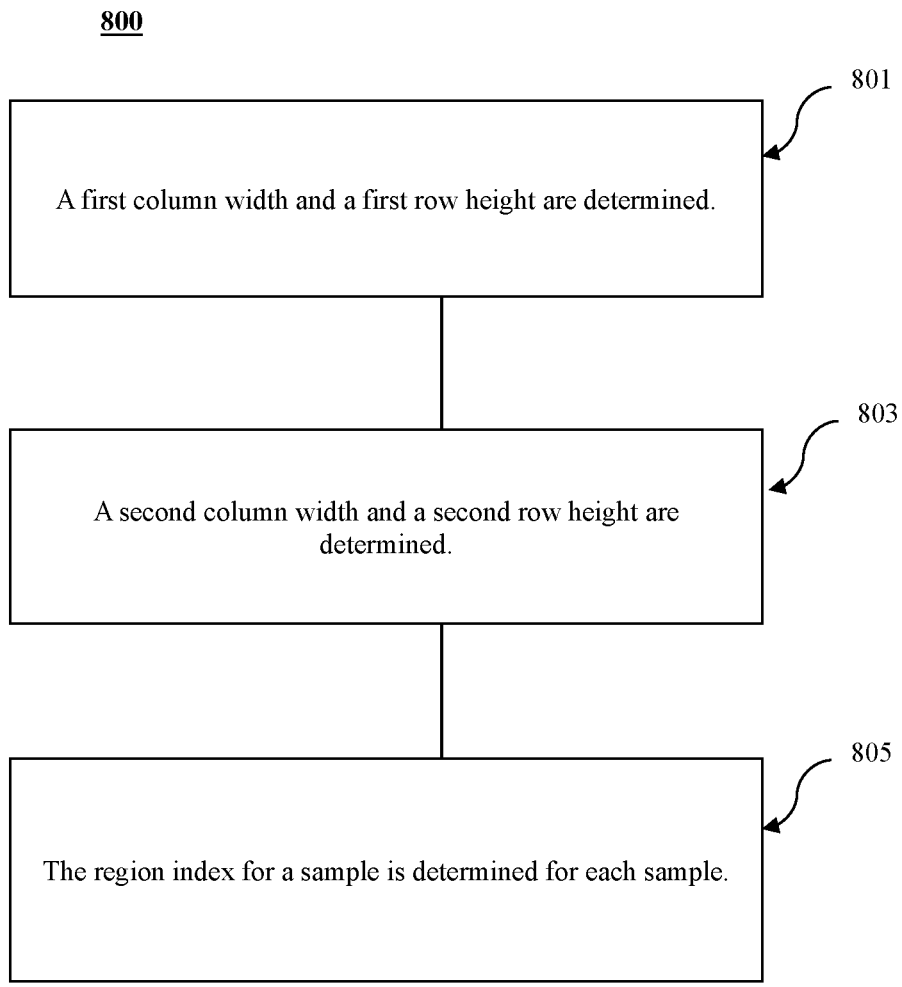
FIG. 8 illustrates a flow chart for determining a region index for each sample, according to some embodiments of present disclosure.

FIG. 8 illustrates a flow chart of an example method 800 for determining a region index for each sample, according to some embodiments of present disclosure. Method 800 can be performed by an encoder (e.g., by process 200A of FIG. 2A or 200B of FIG. 2B), a decoder (e.g., by process 300A of FIG. 3A or 300B of FIG. 3B), or performed by one or more software or hardware components of an apparatus (e.g., apparatus 400 of FIG. 4). For example, a processor (e.g., processor 402 of FIG. 4) can perform method 800. In some embodiments, method 800 can be implemented by a computer program product, embodied in a computer-readable medium, including computer-executable instructions, such as program code, executed by computers (e.g., apparatus 400 of FIG. 4). Referring to FIG. 8, method 800 may include the following steps 801-805.

At step 801, a first column width and a first row height are determined. Determining the first column width further includes: calculating the number of LCUs within the picture in width by up rounding with one LCU; obtaining a column width in the unit of LCU width by dividing the number of LCUs within the picture with the number of region rows; obtaining the first column width in pixel by multiplying the column with in the unit of LCU width by the LCU width. The first row height can be determined in a similar way. In some embodiments, the first column width x_interval and the first row height y_interval can be determined as follows:

$$x\_interval=((((img\_width+lcu\_width-1)/lcu\_width)+RE\_OFFSET\_X)/INTERVAL\_X*lcu\_width);$$

$$y\_interval=((((img\_height+lcu\_height-1)/lcu\_height)+RE\_OFFSET\_Y/INTERVAL\_Y*lcu\_height),$$

wherein img_width is the width of the picture, img_height is the height of the picture, lcu_width and lcu_height is the width and height of LCU. INTERVAL_X is the number of region column and INTERVAL_Y is the number of region row. RE_OFFSET_X and RE_OFFSET_Y are two pre-defined offsets.

At step 803, a second column width and a second row height are determined. Determining the second column width further includes: calculating a first column number based on picture with and the first column width, and clipping the first column number to the number of region column; calculating the second column width based on the picture width, the first column width and the first column number; and aligning the second column width with the LCU width. The second row height can be determined in a similar way. In some embodiments, the second column width x_st_offset and the second row height y_st_offset can be determined as follows:

```
if (y_interval == 0)
{
    y_st_offset = 0;
}
else
{
    y_cnt = Clip3(0, INTERVAL_Y, (img_height + y_interval -
    1) / y_interval);
    y_st_offset = img_height - y_interval*(y_cnt - 1);
    y_st_offset = (y_st_offset + lcu_height / 2) /
    lcu_height*lcu_height;
}
if (x_interval == 0)
{
    x_st_offset = 0;
}
else
{
    x_cnt = Clip3(0, INTERVAL_X, (img_width + x_interval -
    1) / x_interval);
    x_st_offset = img_width - x_interval*(x_cnt - 1);
    x_st_offset = (x_st_offset + lcu_width / 2) /
    lcu_width*lcu_width;
}
```

-continued wherein Clip3(x, y, t) is a function to clip t to y if t is larger than y and clip t to x if t is less than x.

wherein Clip3(x, y, t) is a function to clip t to y if t is larger than y and clip t to x if t is less than x.

At step 805, a region index for a sample is determined for each sample (e.g., with coordinator (g, i)). The coordinator (g, i) indicates a position of the sample in a picture, and the region index for a sample is the index of the region where the sample is. For example, coordinates (0, 0) refer to the top-left sample of the whole picture. In this embodiment, the region index is assigned in raster scan order, e.g., from left to right, and from top to bottom, staring with 0. By calculating the relationship between the coordinator (g, i) of a sample, and the position of each region, the region index for the sample can be obtained. Since, there can be 4 different partitioning patterns (e.g., as shown in FIGS. 7A-7D) applied for a picture, a sample might be in the different regions and thereby has different region index when different partitioning patterns are applied. In some embodiments, the region index for a sample with coordinator (g, i) can be determined as follows:

$y\_idx=(y\_interval==0)?(INTERVAL\_Y-1):(Clip3(0, INTERVAL\_Y-1,i/y\_interval));$ $y\_idx\_offset=y\_idx*INTERVAL\_X;$ $y\_index2=(y\_interval==0||i<y\_st\_offset)?(0):(Clip3(-1,INTERVAL\_Y-2,(i-y\_st\_offset)/y\_interval)+1);$ $y\_index\_offset2=y\_index2*INTERVAL\_X;$ $x\_index=(x\_interval==0)?(INTERVAL\_X-1):(Clip3(0,INTERVAL\_X-1,g/x\_interval));$ $x\_index2=(x\_interval==0||g<x\_st\_offset)?(0):(Clip3(-1,INTERVAL\_X-2,(g-x\_st\_offset)/x\_interval)+1);$ 1) For partitioning pattern in FIG. 7A: region index of sample (g, i) is y_index_offset+x_index;
2) For partitioning pattern in FIG. 7B: region index of sample (g, i) is y_index_offset+x_index2;
3) For partitioning pattern in FIG. 7C: region index of sample (g, i) is y_index_offset2+x_index2;
4) For partitioning pattern in FIG. 7D: region index of sample (g, i) is y_index_offset2+x_index.

FIGS. 9A-9D show another example of different partitioning patterns, according to some embodiments consistent with the present disclosure. In this example, the picture is divided into multiple region columns and region rows. If the picture width W is not a multiple of region column number CN, the widths of region columns are either W/CN or W/CN+1; if the picture height H is not multiple of region row number RN, the heights of region rows are either H/RN or H/RN+1, wherein "/" denotes an integer division. For example, if the picture width is 19 in unit of LCU width and picture height is 11 in unit of LCU height, and if the picture is to be divided into 8 region columns and 8 region rows, then for partitioning pattern in FIG. 9A, the width of each region column is 2, 3, 2, 3, 2, 3, 2, 2 in unit of LCU width, the height of each region row is 1, 2, 1, 2, 1, 2, 1, 1 in unit of LCU height; for partitioning pattern in FIG. 9B, the width of each region column is 3, 2, 3, 2, 3, 2, 2, 2 in unit of LCU width, the height of each region row is 1, 2, 1, 2, 1, 2, 1, 1 in unit of LCU height; for partitioning pattern in FIG. 9C, the width of each region column is 3, 2, 3, 2, 3, 2, 2, 2 in unit of LCU width, the height of each region row is 2, 1, 2, 1, 2, 1, 1, 1 in unit of LCU height; for partitioning pattern in FIG. 9D, the width of each region column is 2, 3, 2, 3, 2, 3, 2, 2 in unit of LCU width, the height of each region row is 2, 1, 2, 1, 2, 1, 1, 1 in unit of LCU height. It can be understood that, the columns and the rows with different widths and heights can be in other possible arrangement orders.

In some embodiments, variable partitioning patterns (e.g., partitioning patterns shown in FIGS. 9A-9D) are supported for a video sequence. The encoder decides which partitioning pattern is used in picture level or sequence level and signals the index indicating partitioning pattern used in the bitstream. The decoder determines the partitioning pattern for the current picture or for the current sequence according to the partitioning pattern index parsed from the bitstream. For example, an index with one of the values among 0 to 3 corresponds to one partitioning pattern of the partitioning patterns shown in FIGS. 9A-9D.

Figures 10A, 10B:
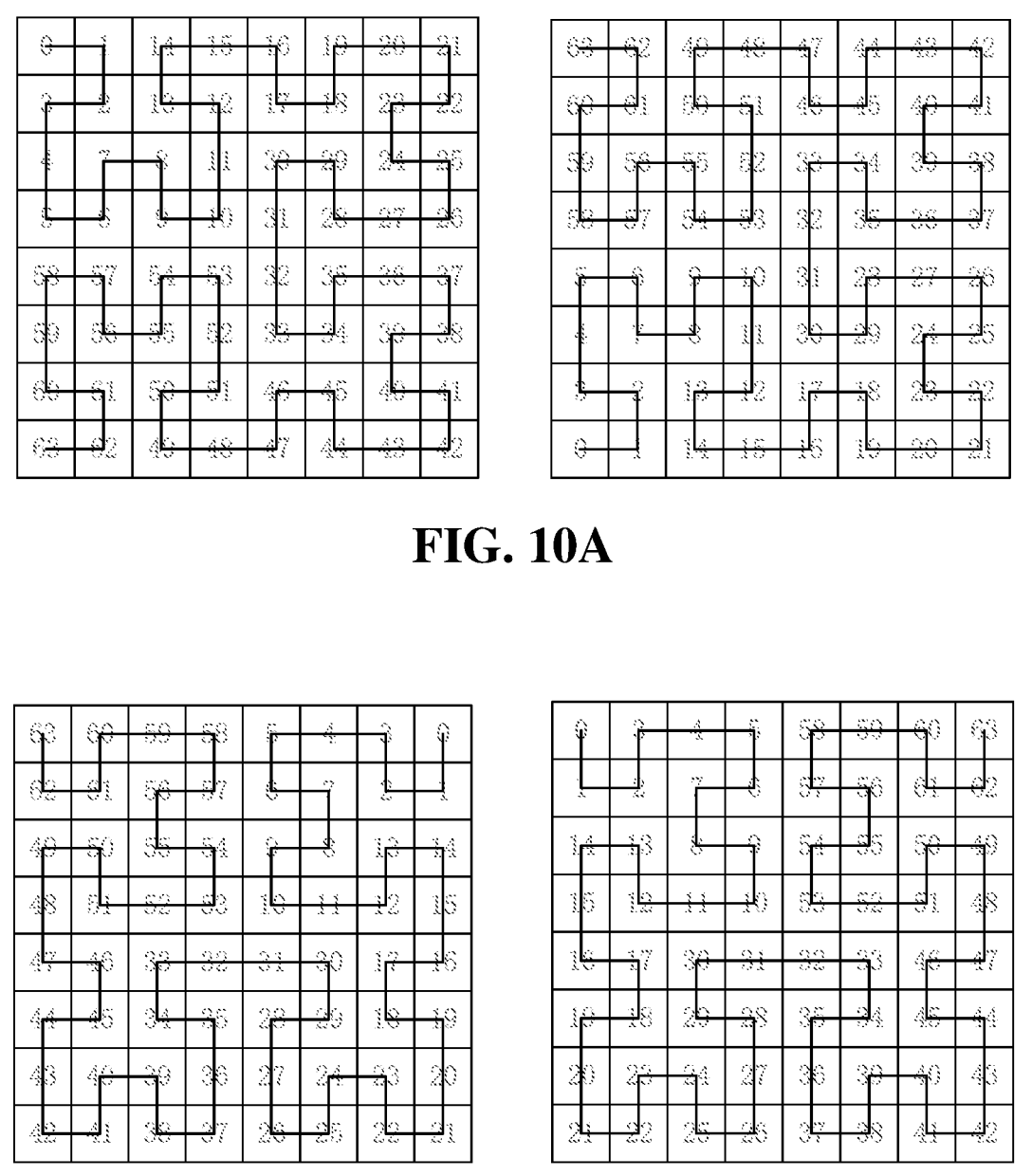

According to some exemplary embodiments, different region orders are proposed. In some embodiments, a Hilbert-like curve can be extended or reversed to serve as the region order. For example, as in FIGS. 10A-10D, a picture is divided into 8 region columns and 8 region rows, the curve in the figure indicates the region order. 4 different orders are shown in FIGS. 10A-10D, respectively. And the number in the Figure shows the region sequence number. These orders may be reversed, flipped, or rotated. If the sequence number i is replaced with 64-i, the order is reversed If a picture is scanned in raster order, the region sequence number of each region in FIG. 10A is:

{0,1,14,15,16,19,20,21,3,2,13,12,17,18,23,22,4,7,8,11,30, 29,24,25,5,6,9,10,31,28,27,26,58,57,54,53,32,35,36,37,59, 56,55,52,33,34,39,38,60,61,50,51,46,45,40,41,63,62,49,48, 47,44,43,42}, or

{63,62,49,48,47,44,43,42,60,61,50,51,46,45,40,41,59,56, 55,52,53,33,34,49,38,58,57,54,53,32,35,36,37,5,6,9,10,31, 28,27,26,4,7,8,11,30,29,24,25,3,2,13,12,17,18,23,22,0,1,14, 15,16,19,20,21}

If a picture is scanned in raster order, the region sequence number of each region in FIG. 10B is:

{63,60,59,58,5,4,3,0,62,61,56,57,6,7,2,1,49,50,55,54,9,8, 13,14,48,51,52,53,10,11,12,15,47,46,33,32,31,30,17,16,44, 45,34,35,28,29,18,19,43,40,39,36,27,24,23,20,42,41,38,37, 26,25,22,21}, or

{0,3,4,5,58,59,60,63,1,2,7,6,57,56,61,62,14,13,8,9,54,55, 50,49,15,12,11,10,53,52,51,48,16,17,30,31,32,33,46,47,19, 18,29,28,35,34,45,44,20,23,24,27,36,39,40,43,21,22,25,26, 27,38,41,42}.

Figures 10C, 10D:
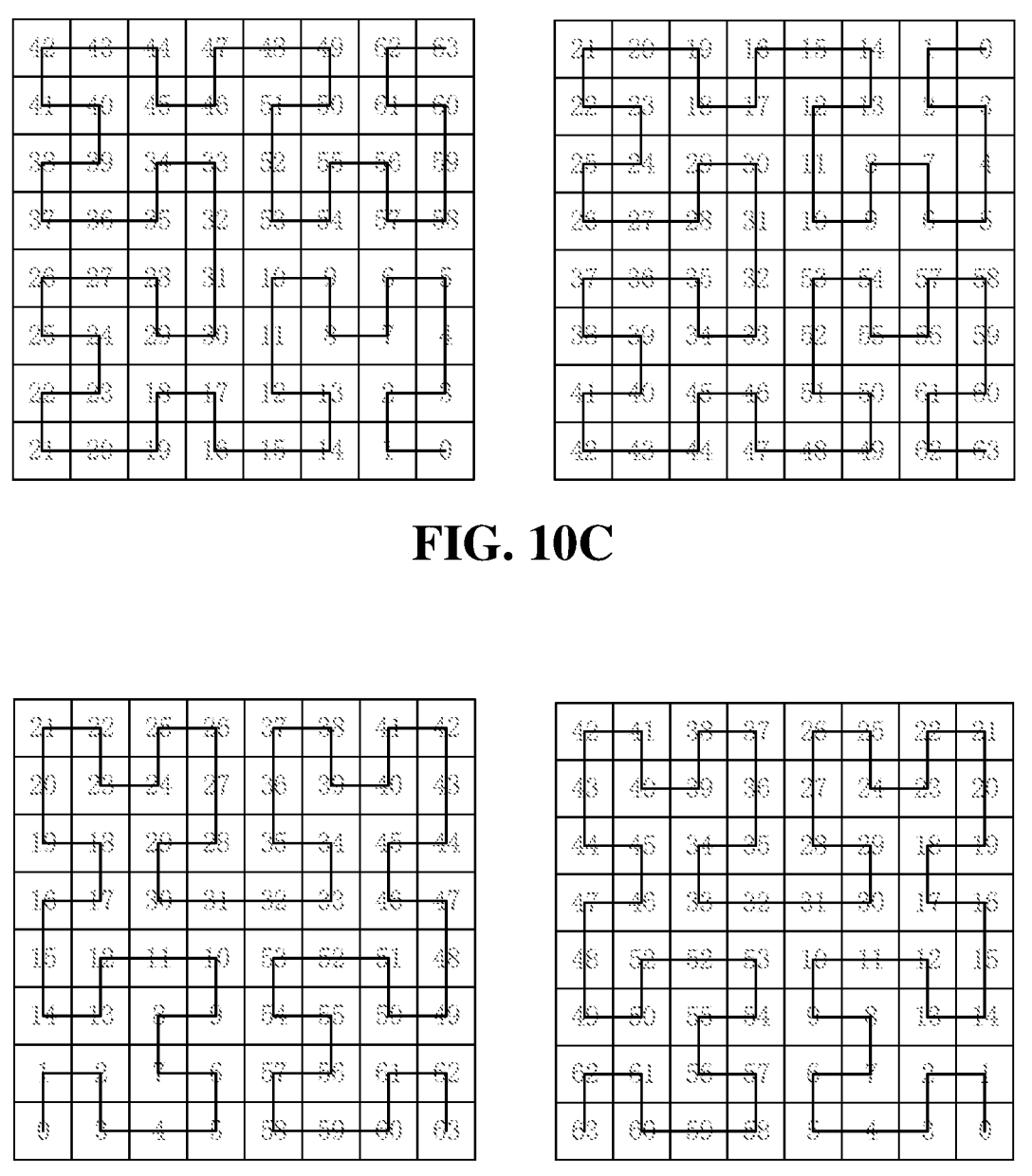

If a picture is scanned in raster order, the region sequence number of each region in FIG. 10C is:

{42,43,44,47,48,49,62,63,41,40,45,46,51,50,61,60,38,39, 34,33,52,55,56,59,37,36,35,32,53,54,57,58,26,27,28,31,10, 9,6,5,25,24,29,30,11,8,7,4,22,23,18,17,12,13,2,3,21,20,19, 16,15,14,1,0}, or

{21,20,19,16,15,14,1,0,22,23,18,17,12,13,2,3,25,24,29,30, 11,8,7,4,26,27,28,31,10,9,6,5,37,36,35,32,53,54,57,58,38, 39,34,33,52,55,56,59,41,40,45,46,51,50,61,60,42,43,41,47, 48,49,62,63}

If a picture is scanned in raster order, the region sequence number of each region in FIG. 10D is:
{21,22,25,26,37,38,41,42,20,23,24,27,36,39,40,43,19,18, 29,28,35,34,45,44,16,17,30,31,32,33,46,47,15,12,11,10,53, 52,51,48,14,13,8,9,54,55,50,49,1,2,7,6,57,56,61,62,0,3,4,5, 58,59,60,63},
or
{42,41,38,37,26,25,22,21,43,40,39,36,27,24,23,20,44,45, 34,35,28,29,18,19,47,46,33,32,31,30,17,16,48,51,52,53,10, 11,12,15,49,50,55,54,9,8,13,14,62,61,56,57,6,7,2,1,63,60, 59,58,5,4,3,0}.

In some embodiments, a picture is divided into 16 region columns and 16 region rows, the curve in the figure indicates the region order. 4 different region orders are shown in FIGS. 11A-11D. These orders may be reversed, flipped, or rotated.

Figure 11A:
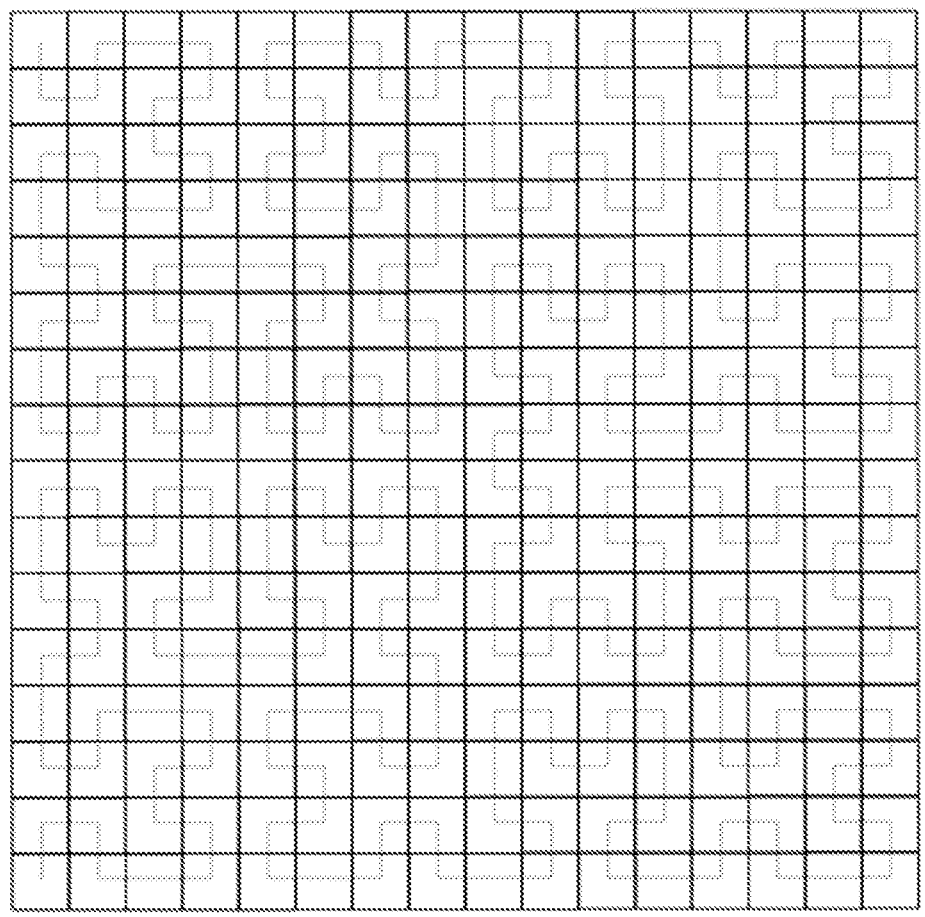
FIG. 11A illustrates an exemplary ALF region order for 256 regions, according to some embodiments of the present disclosure.

If a picture is scanned in raster order, the region sequence number of each region in FIG. 11A is as follows:
{0, 3, 4, 5, 58, 59, 60, 63, 64, 65, 78, 79, 80, 83, 84, 85,
1, 2, 7, 6, 57, 56, 61, 62, 67, 66, 77, 76, 81, 82, 87, 86,
14, 13, 8, 9, 54, 55, 50, 49, 68, 71, 72, 75, 94, 93, 88, 89,
15, 12, 11, 10, 53, 52, 51, 48, 69, 70, 73, 74, 95, 92, 91, 90,
16, 17, 30, 31, 32, 33, 46, 47, 122, 121, 118, 117, 96, 99, 100, 91,
19, 18, 29, 28, 35, 34, 45, 44, 123, 120, 119, 116, 97, 98, 103, 102,
20, 23, 24, 27, 36, 39, 40, 43, 124, 125, 114, 115, 110, 109, 104, 105,
21, 22, 25, 26, 27, 38, 41, 42, 127, 126, 113, 112, 111, 108, 107, 106,
234, 233, 230, 219, 218, 217, 214, 213, 128, 129, 142, 143, 144, 147, 148, 149,
235, 232, 231, 228, 219, 216, 215, 212, 131, 130, 141, 140, 145, 146, 151, 150,
236, 237, 226, 227, 220, 221, 210, 211, 132, 135, 136, 139, 158, 157, 152, 153,
239, 238, 225, 224, 223, 222, 209, 208, 133, 134, 137, 138, 159, 156, 155, 154,
240, 243, 244, 245, 202, 203, 204, 207, 186, 185, 182, 181, 160, 163, 164, 155,
241, 242, 247, 246, 201, 200, 205, 206, 187, 184, 183, 180, 161, 162, 167, 166,
254, 253, 248, 249, 198, 199, 194, 193, 188, 189, 178, 179, 174, 173, 168, 169,
255, 252, 251, 250, 197, 196, 195, 192, 191, 190, 177, 176, 175, 172, 171, 170}.

Figure 11B:
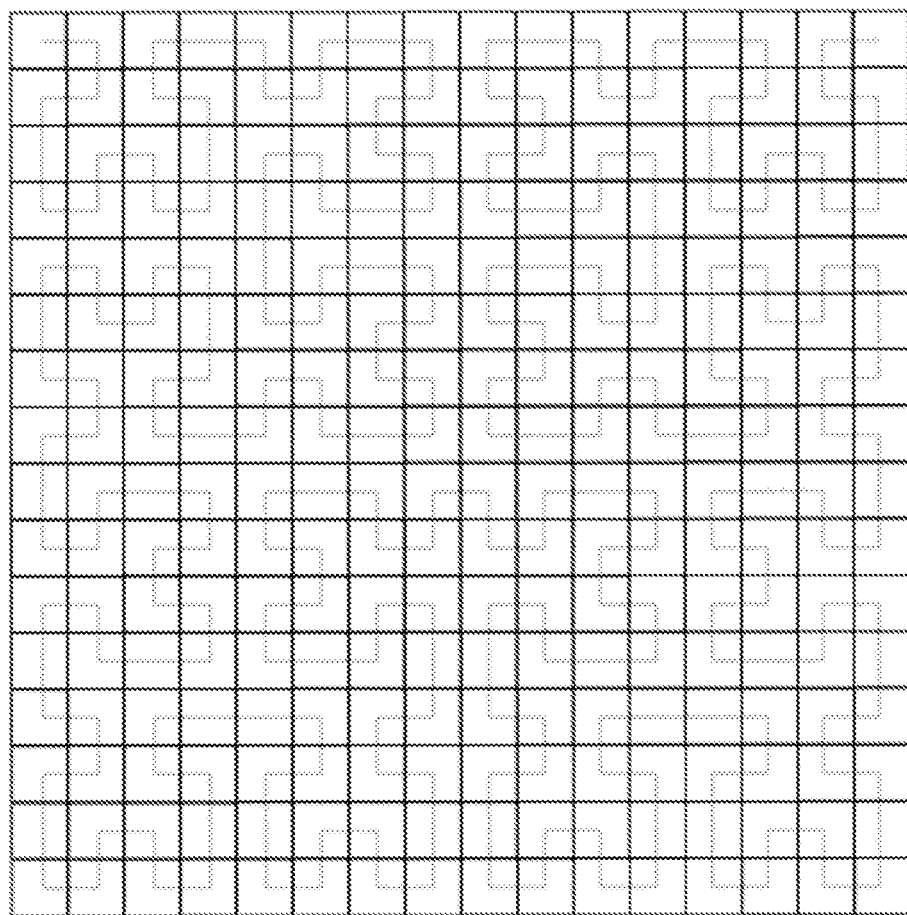
FIG. 11B illustrates another exemplary ALF region order for 256 regions, according to some embodiments of the present disclosure.

If a picture is scanned in raster order, the region sequence number of each region in FIG. 11B is as follows:
{0, 1, 14, 15, 16, 19, 20, 21, 234, 235, 236, 239, 240, 241, 254, 255,
3, 2, 13, 12, 17, 18, 23, 22, 233, 232, 237, 238, 243, 242, 253, 252,
4, 7, 8, 11, 30, 29, 24, 25, 230, 231, 226, 225, 244, 247, 248, 251,
5, 6, 9, 10, 31, 28, 27, 26, 219, 228, 227, 224, 245, 246, 249, 250,
58, 57, 54, 53, 32, 35, 36, 27, 218, 219, 220, 223, 202, 201, 198, 197,
59, 56, 55, 52, 33, 34, 39, 38, 217, 216, 221, 222, 203, 200, 199, 196,
60, 61, 50, 51, 46, 45, 40, 41, 214, 215, 210, 209, 204, 205, 194, 195,
63, 62, 49, 48, 47, 44, 43, 42, 213, 212, 211, 208, 207, 206, 193, 192,
64, 67, 68, 69, 122, 123, 124, 127, 128, 131, 132, 133, 186, 187, 188, 191,
65, 66, 71, 70, 121, 120, 125, 126, 129, 130, 135, 134, 185, 184, 189, 190,
78, 77, 72, 73, 118, 119, 114, 113, 142, 141, 136, 137, 182, 183, 178, 177,
79, 76, 75, 74, 117, 116, 115, 112, 143, 140, 139, 138, 181, 180, 179, 176,
80, 81, 94, 95, 96, 97, 110, 111, 144, 145, 158, 159, 160, 161, 174, 175,
83, 82, 93, 92, 99, 98, 109, 108, 147, 146, 157, 156, 163, 162, 173, 172,
84, 87, 88, 91, 100, 103, 104, 107, 148, 151, 152, 155, 164, 167, 168, 171,
85, 86, 89, 90, 91, 102, 105, 106, 149, 150, 153, 154, 155, 166, 169, 170}.

Figure 11C:
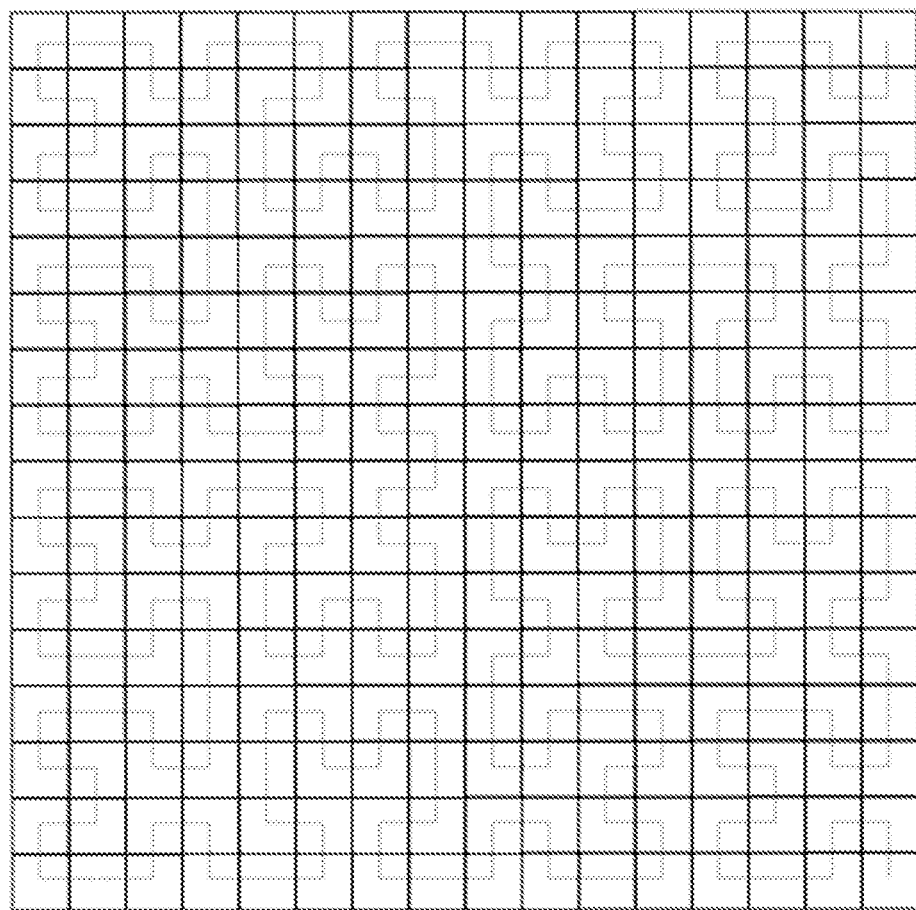
FIG. 11C illustrates another exemplary ALF region order for 256 regions, according to some embodiments of the present disclosure.

The region sequence number of each region in FIG. 11C is as follows:
{170, 171, 172, 175, 176, 177, 190, 191, 192, 195, 196, 197, 250, 251, 252, 255,
169, 168, 173, 174, 179, 178, 189, 188, 193, 194, 199, 198, 249, 248, 253, 254,
166, 167, 162, 161, 180, 183, 184, 187, 206, 205, 200, 201, 246, 247, 242, 241,
155, 164, 163, 160, 181, 182, 185, 186, 207, 204, 203, 202, 245, 244, 243, 240,
154, 155, 156, 159, 138, 137, 134, 133, 208, 209, 222, 223, 224, 225, 238, 239,
153, 152, 157, 158, 139, 136, 135, 132, 211, 210, 221, 220, 227, 226, 237, 236,
150, 151, 146, 145, 140, 141, 130, 131, 212, 215, 216, 219, 228, 231, 232, 235,
149, 148, 147, 144, 143, 142, 129, 128, 213, 214, 217, 218, 219, 230, 233, 234,
106, 107, 108, 111, 112, 113, 126, 127, 42, 41, 38, 27, 26, 25, 22, 21,
105, 104, 109, 110, 115, 114, 125, 124, 43, 40, 39, 36, 27, 24, 23, 20,
102, 103, 98, 97, 116, 119, 120, 123, 44, 45, 34, 35, 28, 29, 18, 19,
91, 100, 99, 96, 117, 118, 121, 122, 47, 46, 33, 32, 31, 30, 17, 16,
90, 91, 92, 95, 74, 73, 70, 69, 48, 51, 52, 53, 10, 11, 12, 15,
89, 88, 93, 94, 75, 72, 71, 68, 49, 50, 55, 54, 9, 8, 13, 14,
86, 87, 82, 81, 76, 77, 66, 67, 62, 61, 56, 57, 6, 7, 2, 1,
85, 84, 83, 80, 79, 78, 65, 64, 63, 60, 59, 58, 5, 4, 3, 0}.

Figure 11D:
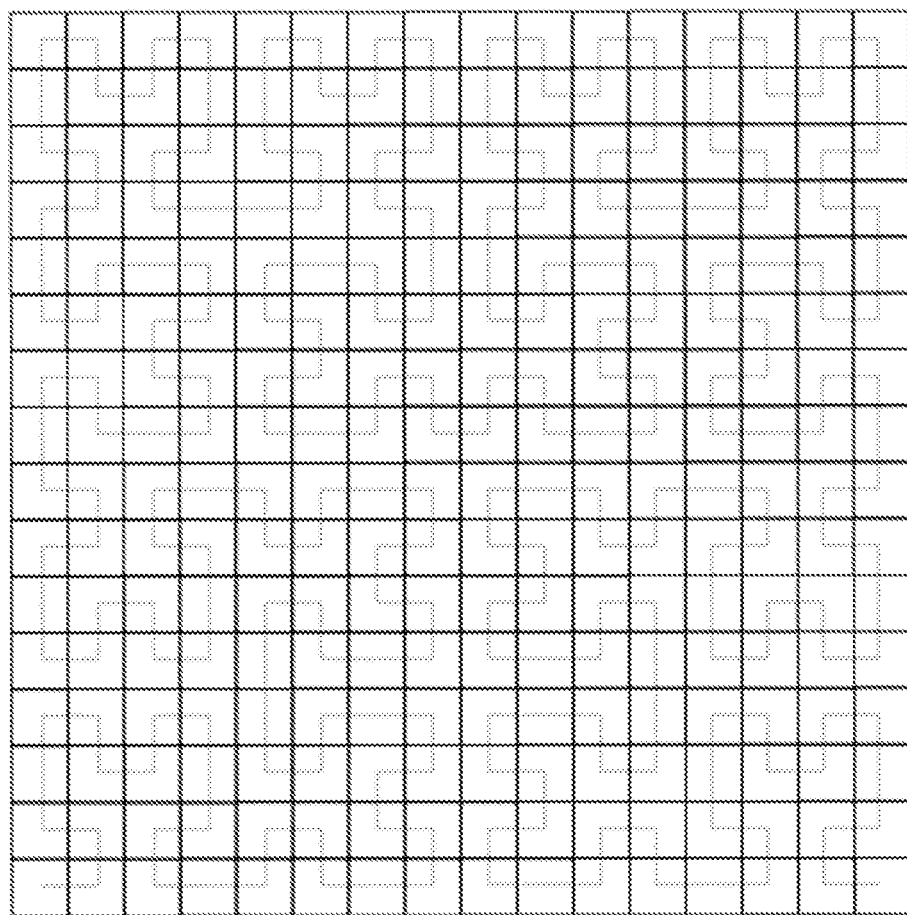
FIG. 11D illustrates another exemplary ALF region order for 256 regions, according to some embodiments of the present disclosure.

If a picture is scanned in raster order, the region sequence number of each region in FIG. 11D is as follows:
{170, 169, 166, 155, 154, 153, 150, 149, 106, 105, 102, 91, 90, 89, 86, 85,
171, 168, 167, 164, 155, 152, 151, 148, 107, 104, 103, 100, 91, 88, 87, 84,
172, 173, 162, 163, 156, 157, 146, 147, 108, 109, 98, 99, 92, 93, 82, 83,
175, 174, 161, 160, 159, 158, 145, 144, 111, 110, 97, 96, 95, 94, 81, 80,
176, 179, 180, 181, 138, 139, 140, 143, 112, 115, 116, 117, 74, 75, 76, 79,
177, 178, 183, 182, 137, 136, 141, 142, 113, 114, 119, 118, 73, 72, 77, 78,
190, 189, 184, 185, 134, 135, 130, 129, 126, 125, 120, 121, 70, 71, 66, 65,
191, 188, 187, 186, 133, 132, 131, 128, 127, 124, 123, 122, 69, 68, 67, 64,
192, 193, 206, 207, 208, 211, 212, 213, 42, 43, 44, 47, 48, 49, 62, 63,
195, 194, 205, 204, 209, 210, 215, 214, 41, 40, 45, 46, 51, 50, 61, 60, 196, 199, 200, 203, 222, 221, 216, 217, 38, 39, 34, 33, 52, 55, 56, 59,
197, 198, 201, 202, 223, 220, 219, 218, 27, 36, 35, 32, 53, 54, 57, 58,
250, 249, 246, 245, 224, 227, 228, 219, 26, 27, 28, 31, 10, 9, 6, 5,
251, 248, 247, 244, 225, 226, 231, 230, 25, 24, 29, 30, 11, 8, 7, 4,
252, 253, 242, 243, 238, 237, 232, 233, 22, 23, 18, 17, 12, 13, 2, 3,
255, 254, 241, 240, 239, 236, 235, 234, 21, 20, 19, 16, 15, 14, 1, 0}.

In the above four region orders, the region sequence number i may be replaced with 255-i, which means that the region order is reversed.

In some embodiments, the region column number is not equal to the region row number. Thus, a Hilbert-like curve cannot be directly applied. In this embodiment, a part of Hilbert-like curve is used. For example, as shown in FIGS. 12A-12D, a picture is divided into 16 region columns and 8 region rows. Thus, only a half Hilbert-like curve is used. 4 region orders are given in FIGS. 12A-12D. These region orders may be reversed, flipped or rotated.

Figure 12A:
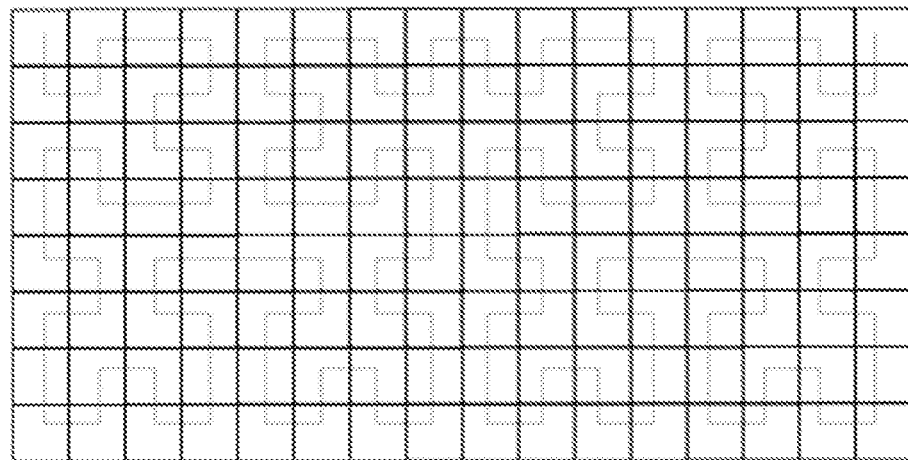
FIG. 12A illustrates an exemplary ALF region order for 128 regions, according to some embodiments of the present disclosure.

If a picture is scanned in raster order, the region sequence number of each region in FIG. 12A is as follows:
{0, 3, 4, 5, 58, 59, 60, 63, 64, 65, 78, 79, 80, 83, 84, 85,
1, 2, 7, 6, 57, 56, 61, 62, 67, 66, 77, 76, 81, 82, 87, 86,
14, 13, 8, 9, 54, 55, 50, 49, 68, 71, 72, 75, 94, 93, 88, 89,
15, 12, 11, 10, 53, 52, 51, 48, 69, 70, 73, 74, 95, 92, 91, 90,
16, 17, 30, 31, 32, 33, 46, 47, 122, 121, 118, 117, 96, 99, 100, 91,
19, 18, 29, 28, 35, 34, 45, 44, 123, 120, 119, 116, 97, 98, 103, 102,
20, 23, 24, 27, 36, 39, 40, 43, 124, 125, 114, 115, 110, 109, 104, 105,
21, 22, 25, 26, 27, 38, 41, 42, 127, 126, 113, 112, 111, 108, 107, 106}.

Figure 12B:
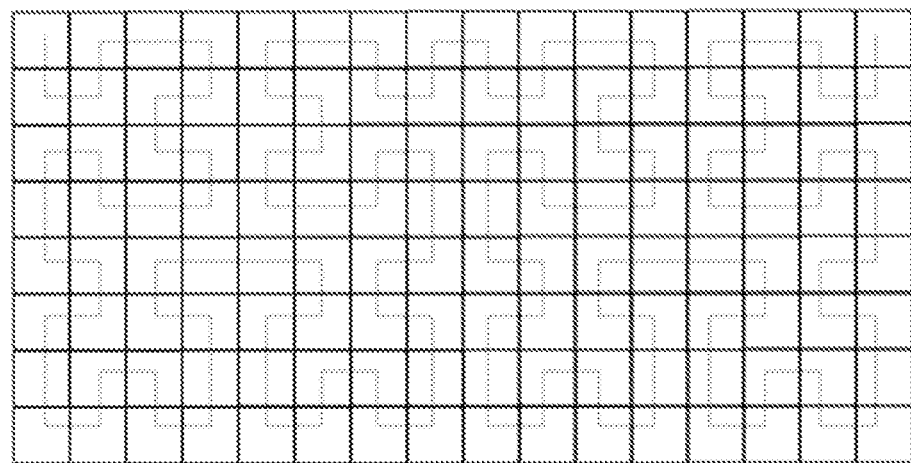
FIG. 12B illustrates another exemplary ALF region order for 128 regions, according to some embodiments of the present disclosure.

If a picture is scanned in raster order, the region sequence number of each region in FIG. 12B is as follows:
{0, 3, 4, 5, 58, 59, 60, 63, 64, 67, 68, 69, 122, 123, 124, 127,
1, 2, 7, 6, 57, 56, 61, 62, 65, 66, 71, 70, 121, 120, 125, 126,
14, 13, 8, 9, 54, 55, 50, 49, 78, 77, 72, 73, 118, 119, 114, 113,
15, 12, 11, 10, 53, 52, 51, 48, 79, 76, 75, 74, 117, 116, 115, 112,
16, 17, 30, 31, 32, 33, 46, 47, 80, 81, 94, 95, 96, 97, 110, 111,
19, 18, 29, 28, 35, 34, 45, 44, 83, 82, 93, 92, 99, 98, 109, 108,
20, 23, 24, 27, 36, 39, 40, 43, 84, 87, 88, 91, 100, 103, 104, 107,
21, 22, 25, 26, 27, 38, 41, 42, 85, 86, 89, 90, 91, 102, 105, 106}.

Figure 12C:
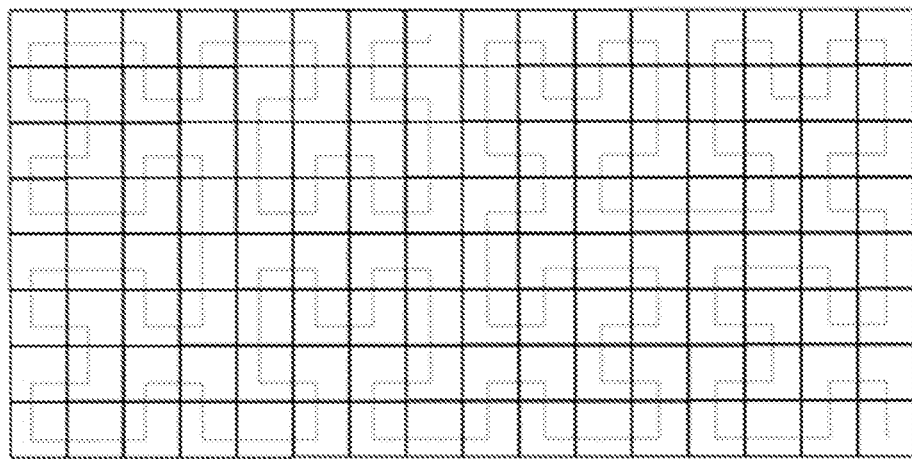
FIG. 12C illustrates another exemplary ALF region order for 128 regions, according to some embodiments of the present disclosure.

If a picture is scanned in raster order, the region index of each region in FIG. 12C is as follows:
{106, 107, 108, 111, 112, 113, 126, 127, 42, 41, 38, 27, 26, 25, 22, 21,
105, 104, 109, 110, 115, 114, 125, 124, 43, 40, 39, 36, 27, 24, 23, 20,
102, 103, 98, 97, 116, 119, 120, 123, 44, 45, 34, 35, 28, 29, 18, 19,
91, 100, 99, 96, 117, 118, 121, 122, 47, 46, 33, 32, 31, 30, 17, 16,
90, 91, 92, 95, 74, 73, 70, 69, 48, 51, 52, 53, 10, 11, 12, 15,
89, 88, 93, 94, 75, 72, 71, 68, 49, 50, 55, 54, 9, 8, 13, 14,
86, 87, 82, 81, 76, 77, 66, 67, 62, 61, 56, 57, 6, 7, 2, 1,
85, 84, 83, 80, 79, 78, 65, 64, 63, 60, 59, 58, 5, 4, 3, 0}.

Figure 12D:
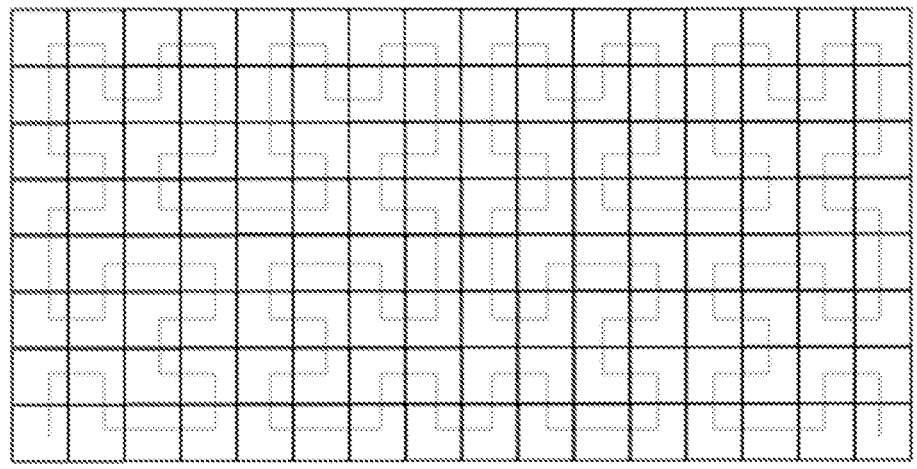
FIG. 12D illustrates another exemplary ALF region order for 128 regions, according to some embodiments of the present disclosure.

If a picture is scanned in raster order, the region sequence number of each region in FIG. 12D is as follows:
{106, 105, 102, 101, 90, 89, 86, 85, 42, 41, 38, 27, 26, 25, 22, 21,
107, 104, 103, 100, 91, 88, 87, 84, 43, 40, 39, 36, 27, 24, 23, 20,
108, 109, 98, 99, 92, 93, 82, 83, 44, 45, 34, 35, 28, 29, 18, 19,
111, 110, 97, 96, 95, 94, 81, 80, 47, 46, 33, 32, 31, 30, 17, 16,
112, 115, 116, 117, 74, 75, 76, 79, 48, 51, 52, 53, 10, 11, 12, 15,
113, 114, 119, 118, 73, 72, 77, 78, 49, 50, 55, 54, 9, 8, 13, 14,
126, 125, 120, 121, 70, 71, 66, 65, 62, 61, 56, 57, 6, 7, 2, 1,
127, 124, 123, 122, 69, 68, 67, 64, 63, 60, 59, 58, 5, 4, 3, 0}.

In the above four region orders, the region sequence number i may be replaced with 127-i so that the region order is reversed.

In some embodiments, variable region orders are supported. The encoder decides which region order is used in picture level or sequence level and signal the index indicating the region order used in the bitstream. The decoder determines the region order for the current picture or for the current sequence according to the region order index parsed from the bitstream. As the example shown in FIGS. 12A-12D, there are four different orders supported for a picture, thus 2 bits are used to code the index with a value from 0 to 3.

Consistent with the disclosed embodiments, partitioning pattern and region order can be combined. According to some exemplary embodiments, both variable partitioning patterns and variable region orders are supported. The combination of partitioning pattern and region order are decided by the encoder and signaled in the bitstream. The decoder, according to the index signaled in the bitstream, determines the partitioning pattern and region order for the current picture or the current sequence.

For example, a picture is divided into 8 region columns and 8 region rows, and two partitioning patterns as shown in FIGS. 7A and 7C are supported and two region orders as shown in FIGS. 10A and 10B are supported. Thus, totally 4 combinations are supported. The encoder selects a combination from these four choices in picture level or sequence level and signal the index indicating the combination of the partitioning pattern and region order selected in the bitstream. As there are four combinations, the index value is from 0 to 3. The decoder decides the combination for the current picture or sequence according to the index signaled in the bitstream. For example, if index is equal to 0, partitioning pattern in FIG. 7A and region order in FIG. 10A are used. if index is equal to 1, partitioning pattern in FIG. 7B and region order in FIG. 10A are used. For example, if index is equal to 2, partitioning pattern in FIG. 7A and region order in FIG. 10B are used. For example, if index is equal to 3, partitioning pattern in FIG. 7B and region order in FIG. 10B are used.

Consistent with the disclosed embodiments, partitioning pattern and region order can be combined, but the combination is restricted. That is, a partitioning pattern can only be applied on a picture or a video sequence together with the corresponding region orders. According to some exemplary embodiments, both variable partitioning patterns and variable region orders are supported. However, a partitioning pattern may not be allowed to combine with each of the supported region order. If a certain partitioning pattern is selected, then only a specified scan order or some specified scans can be used. In some exemplary embodiments, each partitioning pattern can only be applied together with a corresponding region order and each region order can only be applied together with a corresponding partitioning pattern. Thus, the region order and the partitioning pattern can be indicated with one index. And the decoder determines the partitioning pattern and region order according to the index signaled in the bitstream. After determining the partitioning pattern and region order, the decoder can determine the ALF index for the current region and process the region with the correct ALF based on the ALF index.

For example, a picture is divided into 8 region columns and 8 region rows, and four partitioning patterns as shown in FIGS. 7A-7D are supported and four region orders as shown in FIGS. 10A-10D are supported. So totally there are 16 different combinations of partitioning patter and scan order. However, not all these 16 combinations are allowed. The partitioning pattern in FIG. 7A can only be combined with scan order in FIG. 10A; the partitioning pattern in FIG. 7B can only be combined with scan order in FIG. 10B; the partitioning pattern in FIG. 7C can only be combined with scan order in FIG. 10C; the partitioning pattern in FIG. 7D can only be combined with scan order in FIG. 10D. That is, only four combinations are allowed. So, the encoder selects one from these four options for each picture or for the whole sequence and signal the index with value from 0 to 3 in the bitstream. The decoder decides the partitioning pattern and region order according to the index in the bitstream. The disclosure does not restrict on the combination of partitioning pattern and region order. Thus, in another example, the partitioning pattern in FIG. 7A may be together with scan order in FIG. 10B; the partitioning pattern in FIG. 7B may be with scan order in FIG. 10C; the partitioning pattern in FIG. 7C may be together with scan order in FIG. 10D; the partitioning pattern in FIG. 7D may be combined with scan order in FIG. 10A. The index signaled in these embodiments indicates both partitioning pattern and region order.

The embodiments may further be described using the following clauses:

1. A video data processing method, comprising:
 receiving a bitstream;
 decoding a first index from the bitstream;
 determining a maximum number of an adaptive loop filter (ALF) for a component of a picture based on the first index; and
 processing pixels in the picture with the ALF.

2. The method according to clause 1, further comprises:
 in response to the first index being equal to a first value, determining the maximum number of the ALF being 64; or
 in response to the first index being equal to a second value or not equal to the first value, determining the maximum number of the ALF being 16.

3. The method according to clause 1 or 2, before processing the pixels in the picture with the ALF, the method further comprises:
 decoding a second index from the bitstream, wherein the second index indicates an order of ALF regions for the picture.

4. The method according to clause 3, wherein the second index is coded with 2 bits.

5. The method according to clause 3 or 4, wherein processing pixels in the picture with the ALF further comprises:
 determining an ALF index based on the second index; and
 processing the pixels in the picture with the ALF according to the ALF index.

6. The method according to clause 5, wherein determining the ALF index based on the second index further comprises:
 determining a first column width based on a picture width and a Largest Coding Unit (LCU) width;
 determining a first row height based on a picture height and a LCU height;
 determining a region index based on the first column width and the first row height; and
 determining the ALF index based on the region index and the second index.

7. The method according to clause 6, wherein determining the ALF index based on the region index and the second index further comprises:
 determining a second column width based on the first column width, the picture width and the LCU width;
 determining a second row height based on the first row height, the picture height and the LCU height;
 determining the region index based on the first column width, the second column width, the first row height and the second row height; and
 determining the ALF index based on the region index and the second index.

8. The method according to clause 6 or 7, wherein determining the region index based on the first column width and the first row height further comprises:
 determining a first horizontal region index and a second horizontal region index based on the first column width;
 determining a first vertical region index and a second vertical region index based on the first row height; and
 determining the region index based on the first horizontal region index, the second horizontal region index, the first vertical region index and the second vertical region index and the second index.

9. The method according to any one of clauses 6 to 8, wherein determining the ALF index based on the region index and the second index further comprises:
 determining a sequence number based on the region index and the second index; and
 determining the ALF index based on the sequence number.

10. The method according to clause 9, wherein determining the sequence number based on the region index and the second index as follows:

the sequence number = regionTable[the second index][the region index], wherein
regionTable is a two-dimension loop-up table defined as regionTable[4][64]={
{63,60,59,58,5,4,3,0,62,61,56,57,6,7,2,1,49,50,55,54,9,8,13,14,48,51,52,53,10,11,12,15,47,46,33
,32,31,30,17,16,44,45,34,35,28,29,18,19,43,40,39,36,27,24,23,20,42,41,38,37,26,25,22,21},
{42,43,44,47,48,49,62,63,41,40,45,46,51,50,61,60,38,39,34,33,52,55,56,59,37,36,35,32,53,54,57
,58,26,27,28,31,10,9,6,5,25,24,29,30,11,8,7,4,22,23,18,17,12,13,2,3,21,20,19,16,15,1
4,1,0}, -continued {21,22,25,26,37,38,41,42,20,23,24,27,36,39,40,43,19,18,29,28,35,34,45,44,16,17,30,31,32,33,46,47,15,12,11,10,53,52,51,48,14,13,8,9,54,55,50,49,1,2,7,6,57,56,61,62,0,3,4,5,58,59,60,63},
{0,1,14,15,16,19,20,21,3,2,13,12,17,18,23,22,4,7,8,11,30,29,24,25,5,6,9,10,31,28,27,26,58,57,54,53,32,35,36,37,59,56,55,52,33,34,39,38,60,61,50,51,46,45,40,41,63,62,49,48,47,44,43,42}
}.

11. A video data processing method, comprising:
determining a maximum number of an adaptive loop filter (ALF) for a component of a picture;
processing pixels in the picture with the ALF; and
signaling a first index indicating the maximum number of the ALF for the component of the picture.

12. The method according to clause 11, wherein the first index being equal to a first value indicates the maximum number of the ALF is 64; and
the first index being equal to a second value or not equal to the first value indicates the maximum number of the ALF is 16.

13. The method according to clause 11 or 12, further comprising:
determining an order of ALF regions for the picture; and
signaling a second index indicating the order of the ALF regions for the picture.

14. The method according to clause 13, wherein the second index is coded with 2 bits.

15. The method according to clause 13 or 14, further comprising:
determining an ALF index based on the second index; and
processing the pixels in the picture with the ALF according to the ALF index.

16. The method according to clause 15, wherein determining the ALF index based on the second index further comprises:
determining a first column width based on a picture width and a Largest Coding Unit (LCU) width;
determining a first row height based on a picture height and a LCU height;
determining a region index based on the first column width and the first row height; and
determining the ALF index based on the region index and the second index.

17. The method according to clause 16, wherein determining the ALF index based on the region index and the second index further comprises:
determining a second column width based on the first column width, the picture width and the LCU width;
determining a second row height based on the first row height, the picture height and the LCU height;
determining the region index based on the first column width, the second column width, the first row height and the second row height; and
determining the ALF index based on the region index and the second index.

18. The method according to clause 16 or 17, wherein determining the region index based on the first column width and the first row height further comprises:
determining a first horizontal region index and a second horizontal region index based on the first column width;
determining a first vertical region index and a second vertical region index based on the first row height; and
determining the region index based on the first horizontal region index, the second horizontal region index, the first vertical region index and the second vertical region index and the second index.

19. The method according to any one of clauses 16 to 18, wherein determining the ALF index based on the region index and the second index further comprises:
determining a sequence number based on the region index and the second index; and
determining the ALF index based on the sequence number.

20. The method according to clause 19, wherein determining the sequence number based on the region index and the second index as follows:

the sequence number = regionTable[the second index][the region index], wherein regionTable is a two-dimension loop-up table defined as regionTable[4][64]={
{63,60,59,58,5,4,3,0,62,61,56,57,6,7,2,1,49,50,55,54,9,8,13,14,48,51,52,53,10,11,12,15,47,46,33,32,31,30,17,16,44,45,34,35,28,29,18,19,43,40,39,36,27,24,23,20,42,41,38,37,26,25,22,21},
{42,43,44,47,48,49,62,63,41,40,45,46,51,50,61,60,38,39,34,33,52,55,56,59,37,36,35,32,53,54,57,58,26,27,28,31,10,9,6,5,25,24,29,30,11,8,7,4,22,23,18,17,12,13,2,3,21,20,19,16,15,14,1,0},
{21,22,25,26,37,38,41,42,20,23,24,27,36,39,40,43,19,18,29,28,35,34,45,44,16,17,30,31,32,33,46,47,15,12,11,10,53,52,51,48,14,13,8,9,54,55,50,49,1,2,7,6,57,56,61,62,0,3,4,5,58,59,60,63},
{0,1,14,15,16,19,20,21,3,2,13,12,17,18,23,22,4,7,8,11,30,29,24,25,5,6,9,10,31,28,27,26,58,57,54,53,32,35,36,37,59,56,55,52,33,34,39,38,60,61,50,51,46,45,40,41,63,62,49,48,47,44,43,42}
}.

21. An apparatus for performing video data processing, the apparatus comprising:
a memory configured to store instructions; and
one or more processors configured to execute the instructions to cause the apparatus to perform:
receiving a bitstream;
decoding a first index from the bitstream;
determining a maximum number of an adaptive loop filter (ALF) for a component of a picture based on the first index; and
processing pixels in the picture with the ALF.

22. The apparatus according to clause 21, wherein the processor is further configured to execute the instructions to cause the apparatus to perform:
in response to the first index being equal to a first value, determining the maximum number of the ALF being 64; or in response to the first index being equal to a second value or not equal to the first value, determining the maximum number of the ALF being 16.

23. The apparatus according to clause 21 or 22, wherein before processing the pixels in the picture with the ALF, the processor is further configured to execute the instructions to cause the apparatus to perform:
decoding a second index from the bitstream, wherein the second index indicates an order of ALF regions for the picture.

24. The apparatus according to clause 23, wherein the second index is coded with 2 bits.

25. The apparatus according to clause 23 or 24, wherein in processing pixels in the picture with the ALF, the processor is further configured to execute the instructions to cause the apparatus to perform:
determining an ALF index based on the second index; and
processing the pixels in the picture with the ALF according to the ALF index.

26. The apparatus according to clause 25, wherein in determining the ALF index based on the second index, the processor is further configured to execute the instructions to cause the apparatus to perform:
determining a first column width based on a picture width and a Largest Coding Unit (LCU) width;
determining a first row height based on a picture height and a LCU height;
determining a region index based on the first column width and the first row height; and
determining the ALF index based on the region index and the second index.

27. The apparatus according to clause 26, wherein in determining the ALF index based on the region index and the second index, the processor is further configured to execute the instructions to cause the apparatus to perform:
determining a second column width based on the first column width, the picture width and the LCU width;
determining a second row height based on the first row height, the picture height and the LCU height;
determining the region index based on the first column width, the second column width, the first row height and the second row height; and
determining the ALF index based on the region index and the second index.

28. The apparatus according to clause 26 or 27, wherein in determining the region index based on the first column width and the first row height, the processor is further configured to execute the instructions to cause the apparatus to perform:
determining a first horizontal region index and a second horizontal region index based on the first column width;

determining a first vertical region index and a second vertical region index based on the first row height; and
determining the region index based on the first horizontal region index, the second horizontal region index, the first vertical region index and the second vertical region index and the second index.

29. The apparatus according to any one of clauses 26 to 28, wherein in determining the ALF index based on the region index and the second index, the processor is further configured to execute the instructions to cause the apparatus to perform:
determining a sequence number based on the region index and the second index; and
determining the ALF index based on the sequence number.

30. The apparatus according to clause 29, wherein the processor is further configured to execute the instructions to cause the apparatus to perform determining the sequence number based on the region index and the second index as follows:

the sequence number = regionTable[the second index][the region index], wherein
regionTable is a two-dimension loop-up table defined as regionTable[4][64]={
{63,60,59,58,5,4,3,0,62,61,56,57,6,7,2,1,49,50,55,54,9,8,13,14,48,51,52,53,10,11,12,15,47,46,33,32,31,30,17,16,44,45,34,35,28,29,18,19,43,40,39,36,27,24,23,20,42,41,38,37,26,25,22,21},
{42,43,44,47,48,49,62,63,41,40,45,46,51,50,61,60,38,39,34,33,52,55,56,59,37,36,35,32,53,54,57,58,26,27,28,31,10,9,6,5,25,24,29,30,11,8,7,4,22,23,18,17,12,13,2,3,21,20,19,16,15,1
4,1,0},
{21,22,25,26,37,38,41,42,20,23,24,27,36,39,40,43,19,18,29,28,35,34,45,44,16,17,30,31,32,33,46,47,15,12,11,10,53,52,51,48,14,13,8,9,54,55,50,49,1,2,7,6,57,56,61,62,0,3,4,5,58,59,60,63},
{0,1,14,15,16,19,20,21,3,2,13,12,17,18,23,22,4,7,8,11,30,29,24,25,5,6,9,10,31,28,27,26,58,57,54,53,32,35,36,37,59,56,55,52,33,34,39,38,60,61,50,51,46,45,40,41,63,62,49,48,47,44,43,42}
}.

31. An apparatus for performing video data processing, the apparatus comprising:
a memory configured to store instructions; and
one or more processors configured to execute the instructions to cause the apparatus to perform:
determining a maximum number of an adaptive loop filter (ALF) for a component of a picture;
processing pixels in the picture with the ALF; and
signaling a first index indicating the maximum number of the ALF for the component of the picture.

32. The apparatus according to clause 31, wherein the first index being equal to a first value indicates the maximum number of the ALF is 64; and
the first index being equal to a second value or not equal to the first value indicates the maximum number of the ALF is 16.

33. The apparatus according to clause 31 or 32, wherein the processor is further configured to execute the instructions to cause the apparatus to perform:
determining an order of ALF regions for the picture, and
signaling a second index indicating the order of the ALF regions for the picture.

34. The apparatus according to clause 33, wherein the second index is coded with 2 bits.

35. The apparatus according to clause 33 or 34, wherein the processor is further configured to execute the instructions to cause the apparatus to perform:
determining an ALF index based on the second index; and
processing the pixels in the picture with the ALF according to the ALF index.

36. The apparatus according to clause 35, wherein in determining the ALF index based on the second index, the processor is further configured to execute the instructions to cause the apparatus to perform:

determining a first column width based on a picture width and a Largest Coding Unit (LCU) width;

determining a first row height based on a picture height and a LCU height;

determining a region index based on the first column width and the first row height; and determining the ALF index based on the region index and the second index.

37. The apparatus according to clause 36, wherein in determining the ALF index based on the region index and the second index, the processor is further configured to execute the instructions to cause the apparatus to perform:

determining a second column width based on the first column width, the picture width and the LCU width;

determining a second row height based on the first row height, the picture height and the LCU height;

determining the region index based on the first column width, the second column width, the first row height and the second row height; and determining the ALF index based on the region index and the second index.

38. The apparatus according to clause 36 or 37, wherein in determining the region index based on the first column width and the first row height, the processor is further configured to execute the instructions to cause the apparatus to perform:

determining a first horizontal region index and a second horizontal region index based on the first column width;

determining a first vertical region index and a second vertical region index based on the first row height; and determining the region index based on the first horizontal region index, the second horizontal region index, the first vertical region index and the second vertical region index and the second index.

39. The apparatus according to any one of clauses 36 to 38, wherein in determining the ALF index based on the region index and the second index, the processor is further configured to execute the instructions to cause the apparatus to perform:

determining a sequence number based on the region index and the second index; and determining the ALF index based on the sequence number.

40. The apparatus according to clause 39, wherein the processor is further configured to execute the instructions to cause the apparatus to perform determining the sequence number based on the region index and the second index as follows:

41. A non-transitory computer readable medium that stores a set of instructions that is executable by one or more processors of an apparatus to cause the apparatus to initiate a method for performing video data processing, the method comprising:

receiving a bitstream;

decoding a first index from the bitstream;

determining a maximum number of an adaptive loop filter (ALF) for a component of a picture based on the first index; and processing pixels in the picture with the ALF.

42. The non-transitory computer readable medium according to clause 41, wherein the set of instructions that is executable by one or more processors of an apparatus to cause the apparatus to further perform:

in response to the first index being equal to a first value, determining the maximum number of the ALF being 64; or in response to the first index being equal to a second value or not equal to the first value, determining the maximum number of the ALF being 16.

43. The non-transitory computer readable medium according to clause 41 or 42, wherein before processing the pixels in the picture with the ALF, the set of instructions that is executable by one or more processors of an apparatus to cause the apparatus to further perform:

decoding a second index from the bitstream, wherein the second index indicates an order of ALF regions for the picture.

44. The non-transitory computer readable medium according to clause 43, wherein the second index is coded with 2 bits.

45. The non-transitory computer readable medium according to clause 43 or 44, wherein in processing pixels in the picture with the ALF, the set of instructions that is executable by one or more processors of an apparatus to cause the apparatus to further perform:

determining an ALF index based on the second index; and processing the pixels in the picture with the ALF according to the ALF index.

46. The non-transitory computer readable medium according to clause 45, wherein in determining the ALF index based on the second index, the set of instructions that is executable by one or more processors of an apparatus to cause the apparatus to further perform:

determining a first column width based on a picture width and a Largest Coding Unit (LCU) width;

determining a first row height based on a picture height and a LCU height;

determining a region index based on the first column width and the first row height; and determining the ALF index based on the region index and the second index.

--- the sequence number = regionTable[the second index][the region index], wherein
regionTable is a two-dimension loop-up table defined as regionTable[4][64]={
{63,60,59,58,5,4,3,0,62,61,56,57,6,7,2,1,49,50,55,54,9,8,13,14,48,51,52,53,10,11,12,15,47,46,33
,32,31,30,17,16,44,45,34,35,28,29,18,19,43,40,39,36,27,24,23,20,42,41,38,37,26,25,22,21},
{42,43,44,47,48,49,62,63,41,40,45,46,51,50,61,60,38,39,34,33,52,55,56,59,37,36,35,32,53,54,57
,58,26,27,28,31,10,9,6,5,25,24,29,30,11,8,7,4,22,23,18,17,12,13,2,3,21,20,19,16,15,1
4,1,0},
{21,22,25,26,37,38,41,42,20,23,24,27,36,39,40,43,19,18,29,28,35,34,45,44,16,17,30,31,32,33,46
,47,15,12,11,10,53,52,51,48,14,13,8,9,54,55,50,49,1,2,7,6,57,56,61,62,0,3,4,5,58,59,60,63},
{0,1,14,15,16,19,20,21,3,2,13,12,17,18,23,22,4,7,8,11,30,29,24,25,5,6,9,10,31,28,27,26,58,57,54
,53,32,35,36,37,59,56,55,52,33,34,39,38,60,61,50,51,46,45,40,41,63,62,49,48,47,44,43,42}
}.

47. The non-transitory computer readable medium according to clause 46, wherein in determining the ALF index based on the region index and the second index, the set of instructions that is executable by one or more processors of an apparatus to cause the apparatus to further perform:
- determining a second column width based on the first column width, the picture width and the LCU width;
- determining a second row height based on the first row height, the picture height and the LCU height;
- determining the region index based on the first column width, the second column width, the first row height and the second row height; and
- determining the ALF index based on the region index and the second index.

48. The non-transitory computer readable medium according to clause 46, wherein in determining the region index based on the first column width and the first row height, the set of instructions that is executable by one or more processors of an apparatus to cause the apparatus to further perform:
- determining a first horizontal region index and a second horizontal region index based on the first column width;
- determining a first vertical region index and a second vertical region index based on the first row height; and
- determining the region index based on the first horizontal region index, the second horizontal region index, the first vertical region index and the second vertical region index and the second index.

49. The non-transitory computer readable medium according to any one of clauses 46 to 48, wherein in determining the ALF index based on the region index and the second index, the set of instructions that is executable by one or more processors of an apparatus to cause the apparatus to further perform:
- determining a sequence number based on the region index and the second index; and
- determining the ALF index based on the sequence number.

50. The non-transitory computer readable medium according to clause 49, wherein the set of instructions that is executable by one or more processors of an apparatus to cause the apparatus to further perform determining the sequence number based on the region index and the second index as follows:

the sequence number = regionTable[the second index][the region index], wherein
regionTable is a two-dimension loop-up table defined as regionTable[4][64]={
{63,60,59,58,5,4,3,0,62,61,56,57,6,7,2,1,49,50,55,54,9,8,13,14,48,51,52,53,10,11,12,15,47,46,33
,32,31,30,17,16,44,45,34,35,28,29,18,19,43,40,39,36,27,24,23,20,42,41,38,37,26,25,22,21},
{42,43,44,47,48,49,62,63,41,40,45,46,51,50,61,60,38,39,34,33,52,55,56,59,37,36,35,32,53,54,57
,58,26,27,28,31,10,9,6,5,25,24,29,30,11,8,7,4,22,23,18,17,12,13,2,3,21,20,19,16,15,1
4,1,0},
{21,22,25,26,37,38,41,42,20,23,24,27,36,39,40,43,19,18,29,28,35,34,45,44,16,17,30,31,32,33,46
,47,15,12,11,10,53,52,51,48,14,13,8,9,54,55,50,49,1,2,7,6,57,56,61,62,0,3,4,5,58,59,60,63},
{0,1,14,15,16,19,20,21,3,2,13,12,17,18,23,22,4,7,8,11,30,29,24,25,5,6,9,10,31,28,27,26,58,57,54
,53,32,35,36,37,59,56,55,52,33,34,39,38,60,61,50,51,46,45,40,41,63,62,49,48,47,44,43,42}
}.

51. A non-transitory computer readable medium that stores a set of instructions that is executable by one or more processors of an apparatus to cause the apparatus to initiate a method for performing video data processing, the method comprising:
- determining a maximum number of an adaptive loop filter (ALF) for a component of a picture;
- processing pixels in the picture with the ALF; and
- signaling a first index indicating the maximum number of the ALF for the component of the picture.

52. The non-transitory computer readable medium according to clause 51, wherein the first index being equal to a first value indicates the maximum number of the ALF is 64; and
the first index being equal to a second value or not equal to the first value indicates the maximum number of the ALF is 16.

53. The non-transitory computer readable medium according to clause 51 or 51, wherein the set of instructions that is executable by one or more processors of an apparatus to cause the apparatus to further perform:
- determining an order of ALF regions for the picture, and
- signaling a second index indicating the order of the ALF regions for the picture.

54. The non-transitory computer readable medium according to clause 53, wherein the second index is coded with 2 bits.

55. The non-transitory computer readable medium according to clause 53 or 54, wherein the set of instructions that is executable by one or more processors of an apparatus to cause the apparatus to further perform:
- determining an ALF index based on the second index; and
- processing the pixels in the picture with the ALF according to the ALF index.

56. The non-transitory computer readable medium according to clause 55, wherein in determining the ALF index based on the second index, the set of instructions that is executable by one or more processors of an apparatus to cause the apparatus to further perform:
- determining a first column width based on a picture width and a Largest Coding Unit (LCU) width;
- determining a first row height based on a picture height and a LCU height;
- determining a region index based on the first column width and the first row height; and
- determining the ALF index based on the region index and the second index.

57. The non-transitory computer readable medium according to clause 56, wherein in determining the ALF index based on the region index and the second index, the set of instructions that is executable by one or more processors of an apparatus to cause the apparatus to further perform:
- determining a second column width based on the first column width, the picture width and the LCU width;
- determining a second row height based on the first row height, the picture height and the LCU height;
- determining the region index based on the first column width, the second column width, the first row height and the second row height; and
- determining the ALF index based on the region index and the second index.

58. The non-transitory computer readable medium according to clause 56 or 57, wherein in determining the region index based on the first column width and the first row height, the set of instructions that is executable by one or more processors of an apparatus to cause the apparatus to further perform:
- determining a first horizontal region index and a second horizontal region index based on the first column width;
- determining a first vertical region index and a second vertical region index based on the first row height; and
- determining the region index based on the first horizontal region index, the second horizontal region index, the first vertical region index and the second vertical region index and the second index.

59. The non-transitory computer readable medium according to any one of clauses 56 to 58, wherein in determining the ALF index based on the region index and the second index, the set of instructions that is executable by one or more processors of an apparatus to cause the apparatus to further perform:
- determining a sequence number based on the region index and the second index; and
- determining the ALF index based on the sequence number.

60. The non-transitory computer readable medium according to clause 59, wherein the set of instructions that is executable by one or more processors of an apparatus to cause the apparatus to further perform determining the sequence number based on the region index and the second index as follows:

the sequence number = regionTable[the second index][the region index], wherein
regionTable is a two-dimension loop-up table defined as regionTable[4][64]={
{63,60,59,58,5,4,3,0,62,61,56,57,6,7,2,1,49,50,55,54,9,8,13,14,48,51,52,53,10,11,12,15,47,46,33
,32,31,30,17,16,44,45,34,35,28,29,18,19,43,40,39,36,27,24,23,20,42,41,38,37,26,25,22,21},
{42,43,44,47,48,49,62,63,41,40,45,46,51,50,61,60,38,39,34,33,52,55,56,59,37,36,35,32,53,54,57
,58,26,27,28,31,10,9,6,5,25,24,29,30,11,8,7,4,22,23,18,17,12,13,2,3,21,20,19,16,15,1
4,1,0},
{21,22,25,26,37,38,41,42,20,23,24,27,36,39,40,43,19,18,29,28,35,34,45,44,16,17,30,31,32,33,46
,47,15,12,11,10,53,52,51,48,14,13,8,9,54,55,50,49,1,2,7,6,57,56,61,62,0,3,4,5,58,59,60,63},
{0,1,14,15,16,19,20,21,3,2,13,12,17,18,23,22,4,7,8,11,30,29,24,25,5,6,9,10,31,28,27,26,58,57,54
,53,32,35,36,37,59,56,55,52,33,34,39,38,60,61,50,51,46,45,40,41,63,62,49,48,47,44,43,42}
}.

61. A non-transitory computer readable medium storing a bitstream,
wherein the bitstream comprises a first index associated with video data, the first index indicating a maximum number of an adaptive loop filter (ALF) for a component of a picture.

62. The non-transitory computer readable medium according to clause 61, wherein the data stream comprises a second index associated with video data, the second index indicating an order of ALF region for the picture.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments.

Accordingly, although specific terms are employed, they are used in a generic and descriptive sense only and not for purposes of limitation.

What is claimed is:

1. A video data processing method, comprising:
   receiving a bitstream;
   decoding a first index from the bitstream;
   determining a maximum number of adaptive loop filters (ALFs) for a component of a picture based on the first index, wherein:
   the maximum number of the ALFs is at least 64 when the first index is equal to a first value; and
   the maximum number of the ALFs is 16 when the first index is equal to a second value or not equal to the first value; and
   processing pixels in the picture with the ALFs.

2. The method according to claim 1, before processing the pixels in the picture with the ALFs, the method further comprises:
   decoding a second index from the bitstream, wherein the second index indicates an order of ALF regions for the picture.

3. The method according to claim 2, wherein the second index is coded with 2 bits.

4. The method according to claim 2, wherein processing pixels in the picture with the ALFs further comprises:
   determining an ALF index based on the second index; and
   processing the pixels in the picture with the ALFs according to the ALF index.

5. The method according to claim 4, wherein determining the ALF index based on the second index further comprises:
   determining a first column width based on a picture width and a Largest Coding Unit (LCU) width;
   determining a first row height based on a picture height and a LCU height;
   determining a region index based on the first column width and the first row height; and
   determining the ALF index based on the region index and the second index.

6. The method according to claim 5, wherein determining the ALF index based on the region index and the second index further comprises:
   determining a second column width based on the first column width, the picture width and the LCU width;
   determining a second row height based on the first row height, the picture height and the LCU height;
   determining the region index based on the first column width, the second column width, the first row height and the second row height; and
   determining the ALF index based on the region index and the second index.

7. The method according to claim 5, wherein determining the region index based on the first column width and the first row height further comprises:
   determining a first horizontal region index and a second horizontal region index based on the first column width;
   determining a first vertical region index and a second vertical region index based on the first row height; and
   determining the region index based on the first horizontal region index, the second horizontal region index, the first vertical region index and the second vertical region index and the second index.

8. The method according to claim 5, wherein determining the ALF index based on the region index and the second index further comprises:
   determining a sequence number based on the region index and the second index; and
   determining the ALF index based on the sequence number.

9. The method according to claim 8, wherein determining the sequence number based on the region index and the second index as follows:
   the sequence number=regionTable [the second index][the region index], wherein regionTable is a two-dimension look-up table defined as regionTable [4][64]={ the sequence number = regionTable[the second index][the region index], wherein regionTable is a two-dimension loop-up table defined as regionTable[4][64]={
{63,60,59,58,5,4,3,0,62,61,56,57,6,7,2,1,49,50,55,54,9,8,13,14,48,51,52,53,10,11,12,15,47,46,33,32,31,30,17,16,44,45,34,35,28,29,18,19,43,40,39,36,27,24,23,20,42,41,38,37,26,25,22,21},
{42,43,44,47,48,49,62,63,41,40,45,46,51,50,61,60,38,39,34,33,52,55,56,59,37,36,35,32,53,54,57,58,26,27,28,31,10,9,6,5,25,24,29,30,11,8,7,4,22,23,18,17,12,13,2,3,21,20,19,16,15,1 4,1,0},
{21,22,25,26,37,38,41,42,20,23,24,27,36,39,40,43,19,18,29,28,35,34,45,44,16,17,30,31,32,33,46,47,15,12,11,10,53,52,51,48,14,13,8,9,54,55,50,49,1,2,7,6,57,56,61,62,0,3,4,5,58,59,60,63},
{0,1,14,15,16,19,20,21,3,2,13,12,17,18,23,22,4,7,8,11,30,29,24,25,5,6,9,10,31,28,27,26,58,57,54,53,32,35,36,37,59,56,55,52,33,34,39,38,60,61,50,51,46,45,40,41,63,62,49,48,47,44,43,42}
}.

10. An apparatus for performing video data processing, the apparatus comprising:
    a memory configured to store instructions; and
    one or more processors configured to execute the instructions to cause the apparatus to perform operations comprising:
    receiving a bitstream;
    decoding a first index from the bitstream;
    determining a maximum number of adaptive loop filters (ALFs) for a component of a picture based on the first index, wherein:
    the maximum number of the ALFs is at least 64 when the first index is equal to a first value; and
    the maximum number of the ALFs is 16 when the first index is equal to a second value or not equal to the first value; and
    processing pixels in the picture with the ALFs.

11. The apparatus according to claim 10, wherein before processing the pixels in the picture with the ALF, the operations further comprise:
    decoding a second index from the bitstream, wherein the second index indicates an order of ALF regions for the picture.

12. The apparatus according to claim 11, wherein in processing pixels in the picture with the ALFs, the operations further comprise:
    determining an ALF index based on the second index; and
    processing the pixels in the picture with the ALF according to the ALF index.

13. The apparatus according to claim 12, wherein in determining the ALF index based on the second index, the operations further comprise:
- determining a first column width based on a picture width and a Largest Coding Unit (LCU) width;
- determining a first row height based on a picture height and a LCU height;
- determining a region index based on the first column width and the first row height; and
- determining the ALF index based on the region index and the second index.

14. The apparatus according to claim 13, wherein determining the ALF index based on the region index and the second index further comprises:
- determining a second column width based on the first column width, the picture width and the LCU width;
- determining a second row height based on the first row height, the picture height and the LCU height;
- determining the region index based on the first column width, the second column width, the first row height and the second row height; and
- determining the ALF index based on the region index and the second index.

15. A non-transitory computer readable medium storing a bitstream of a video for processing according to a method comprising:
- decoding a first index from the bitstream;
  - determining a maximum number of adaptive loop filters (ALFs) for a component of a picture based on the first index, wherein:
    - the maximum number of the ALFs is at least 64 when the first index is equal to a first value; and
    - the maximum number of the ALFs is 16 when the first index is equal to a second value or not equal to the first value; and
  - processing pixels in the picture with the ALFs.

16. The non-transitory computer readable medium according to claim 15, wherein before processing the pixels in the picture with the ALFs, the method further comprises:
- decoding a second index from the bitstream, wherein the second index indicates an order of ALF regions for the picture.

17. The non-transitory computer readable medium according to claim 16, wherein in processing pixels in the picture with the ALFs, the method further comprises:
- determining an ALF index based on the second index; and
- processing the pixels in the picture with the ALFs according to the ALF index.

18. The non-transitory computer readable medium according to claim 17, wherein in determining the ALF index based on the second index, the method further comprises:
- determining a first column width based on a picture width and a Largest Coding Unit (LCU) width;
- determining a first row height based on a picture height and a LCU height;
- determining a region index based on the first column width and the first row height; and
- determining the ALF index based on the region index and the second index.

19. The non-transitory computer readable medium according to claim 18, wherein determining the ALF index based on the region index and the first index further comprises:
- determining a second column width based on the first column width, the picture width and the LCU width;
- determining a second row height based on the first row height, the picture height and the LCU height;
- determining the region index based on the first column width, the second column width, the first row height and the second row height; and
- determining the ALF index based on the region index and the first index.

20. The non-transitory computer readable medium according to claim 18, wherein determining the region index based on the first column width and the first row height further comprises:
- determining a first horizontal region index and a second horizontal region index based on the first column width;
- determining a first vertical region index and a second vertical region index based on the first row height; and
- determining the region index based on the first horizontal region index, the second horizontal region index, the first vertical region index and the second vertical region index and the first index.

* * * * *